(12) United States Patent
Jain et al.

(10) Patent No.: US 12,079,495 B2
(45) Date of Patent: Sep. 3, 2024

(54) INPUT/OUTPUT OPERATIONS PER SECOND (IOPS) AND THROUGHPUT MONITORING FOR DYNAMIC AND OPTIMAL RESOURCE ALLOCATION

(71) Applicant: NetApp Inc., San Jose, CA (US)

(72) Inventors: Priyanka Jain, Bangalore (IN); Srikanth Venkatesh Goutham, Bangalore (IN); Dilip Krishnan, Kerala (IN); Suruchi Kumari, Bangalore (IN); Rama Kant Pathak, Bahraich (IN); Arun Pandey, Bangalore (IN); Venkata Manikanta Reddy Mopuri, Telangana (IN)

(73) Assignee: NetApp, Inc., San Jose, CA (US)

( * ) Notice: Subject to any disclaimer, the term of this patent is extended or adjusted under 35 U.S.C. 154(b) by 209 days.

(21) Appl. No.: 17/587,175

(22) Filed: Jan. 28, 2022

(65) Prior Publication Data
US 2023/0244392 A1    Aug. 3, 2023

(51) Int. Cl.
*G06F 3/06*    (2006.01)

(52) U.S. Cl.
CPC .......... *G06F 3/0631* (2013.01); *G06F 3/0613* (2013.01); *G06F 3/0617* (2013.01); *G06F 3/0659* (2013.01); *G06F 3/0664* (2013.01); *G06F 3/067* (2013.01)

(58) Field of Classification Search
CPC .... G06F 3/0604; G06F 3/0631; G06F 3/0613; G06F 3/0617; G06F 3/0659; G06F 3/0664; G06F 3/067; G06F 9/5016
See application file for complete search history.

(56) References Cited

U.S. PATENT DOCUMENTS

| | | | |
|---|---|---|---|
| 9,631,639 B1 | 4/2017 | Shinsato et al. | |
| 9,635,101 B2 | 4/2017 | Mathur et al. | |
| 11,075,852 B2 | 7/2021 | Miller | |
| 11,403,000 B1* | 8/2022 | Barker, Jr. | G06F 3/0664 |
| 2015/0104029 A1 | 4/2015 | Cheng et al. | |
| 2023/0016170 A1* | 1/2023 | Barker, Jr | G06F 9/5016 |

OTHER PUBLICATIONS

Stephen Carl, et al.; NetApp; NetApp E-Series and MongoDB; Apr. 2016; 32 Pgs.

(Continued)

*Primary Examiner* — Ernest Unelus
(74) *Attorney, Agent, or Firm* — Cooper Legal Group, LLC

(57) ABSTRACT

Techniques are provided for input/output operations per second (IOPS) and throughput monitoring for dynamic and/or optimal resource allocation. These techniques provide automated monitoring of resources, such as memory and processor utilization by a container accessing a volume. The automated monitoring is performed in order to generate and execute intelligent recommendations for improved resource utilization. Resource allocations can be scaled up to meet I/O load demand and satisfy service level agreements (SLAs). Resource allocations can be scaled down or adjusted to conserve resources, such as by consolidating containers or pods hosted in multiple virtual machines into a single virtual machine and decommissioning virtual machines no longer hosting containers or pods.

19 Claims, 9 Drawing Sheets

(56) References Cited

OTHER PUBLICATIONS

NetApp; OnCommand® Balance 4.2; User Guide; Aug. 2014; 329 Pgs.
Storage performance: IOPS, latency and throughput.
SPOT by NetApp; Kubernetes Autoscaling: 3 Methods andHow to Make Them Great; What is Autoscaling in Kubernetes? Jan. 27, 2022; 10 Pgs.
Cloud central; Kubernetes Storage; Google Kubernetes Engine: Ultimate QuickStart Guide; Jun. 10, 202; https://cloud.netapp.com/blog/gcp-cvo-big-google-kubernetes-engine-ultimate-quick-start-guide; 9 Pgs.
Amazon EKS; Vertical Pod Autoscaler; https://docs.aws.amazon.com/eks/latest/userguide/vertical-pod-autoscaler.html; Jan. 27, 2022; 5 Pgs.
Vertical Pod autoscaling | Kubernetes Engine Documentation | Google Cloud; Vert ical Pod autoscaling; https://cloud.google.com/kubernetes-engine/docs/concepts/verticalpodautoscaler; 9 Pgs.
What can NetApp's Cloud Volumes Services do?—Volta; Jan. 27, 2022; 3 Pgs.
Oracle Cloud Infrastructure Documentation; Using the Kubernetes Vertical Pod Autoscaler; 9 Pgs.
Use cases | NetApp Cloud vols. Service for Google Cloud; Use cases; Jan. 27, 2022; 4 Pgs.
Puja Abbassi; Vertical autoscaling in Kubernetes » Giant Swarm; Vertical autoscaling in Kubernetes; Jan. 27, 2022; 10 Pgs.

\* cited by examiner

```
Node schedule_based_on_iops_and_throughput(pod):                    ← 470
    For every node in the cluster:
                    Iops = 0
                    Throughput = 0
                    For every dmap pod in the node:
                                    (cumulative_iops,       ← 471
cumulative_throughput) += get_iops_throughput(pod)          ← 472
                                    Available_iops = vm_iops_lmit -
cumulative_iops
                                    Available_throughput =  ← 473
vm_throughput_limit - cumulative_throughput
                                    iops_diff =      ← 474
iops_of_pod_to_be_scheduled - available_iops
                                    throughput_diff =    ← 475
throughput_of_pod_to_be_scheduled - available_throughput
                                    node = find node with min  ← 476
throughput_diff and iops_diff + headroom return node
```

FIG. 4C

INPUT/OUTPUT OPERATIONS PER SECOND (IOPS) AND THROUGHPUT MONITORING FOR DYNAMIC AND OPTIMAL RESOURCE ALLOCATION

TECHNICAL FIELD

Various embodiments generally relate to managing resources assigned to containers. More specifically, some embodiments relate to methods and systems for dynamic and/or optimal resource allocation based on input/output operations per second (IOPS) and throughput monitoring.

BACKGROUND

Historically, developers have built applications designed to be run on a single platform. This makes resource allocation simple and straight forward. For example, an application may be hosted on a server, and thus the application may utilize memory, storage, and processor resources of the server. However, building and deploying these types of applications is no longer desirable in most instances as many modern applications often need to efficiently and securely scale (potentially across multiple platforms) based on demand. There are many options for developing scalable, modern applications. Examples include, but are not limited to, virtual machines, microservices, and containers. The choice often depends on a variety of factors such as the type of workload, available ecosystem resources, need for automated scaling, and/or execution preferences.

When developers select a containerized approach for creating scalable applications, portions (e.g., microservices, larger services, etc.) of the application are packaged into containers. Each container may comprise software code, binaries, system libraries, dependencies, system tools, and/or any other components or settings needed to execute the application. In this way, the container is a self-contained execution enclosure for executing that portion of the application.

Unlike virtual machines, containers do not include operating system images. Instead, containers ride on a host operating system which is often light weight allowing for faster boot and utilization of less memory than a virtual machine. The containers can be individually replicated and scaled to accommodate demand. Management of the container (e.g., scaling, deployment, upgrading, health monitoring, etc.) is often automated by a container orchestration platform (e.g., Kubernetes).

The container orchestration platform can deploy containers on nodes (e.g., a virtual machine, physical hardware, etc.) that have allocated compute resources (e.g., processor, memory, etc.) for executing applications hosted within containers. Applications (or processes) hosted within multiple containers may interact with one another and cooperate together. For example, a storage application within a container may access a deduplication application and a compression application within other containers in order deduplicate and/or compress data managed by the storage application. Container orchestration platforms often offer the ability to support these cooperating applications (or processes) as a grouping (e.g., in Kubernetes this is referred to as a pod). This grouping (e.g., a pod) can supports multiple containers and forms a cohesive unit of service for the applications (or services) hosted within the containers. Containers that are part of a pod may be co-located and scheduled on a same node, such as the same physical hardware or virtual machine. This allows the containers to share resources and dependencies, communicate with one another, and/or coordinate their lifecycles of how and when the containers are terminated.

DESCRIPTION OF THE DRAWINGS

FIG. 4C is an embodiment of a pod placement strategy in accordance with various embodiments of the present technology.

DETAILED DESCRIPTION

Figure 1:
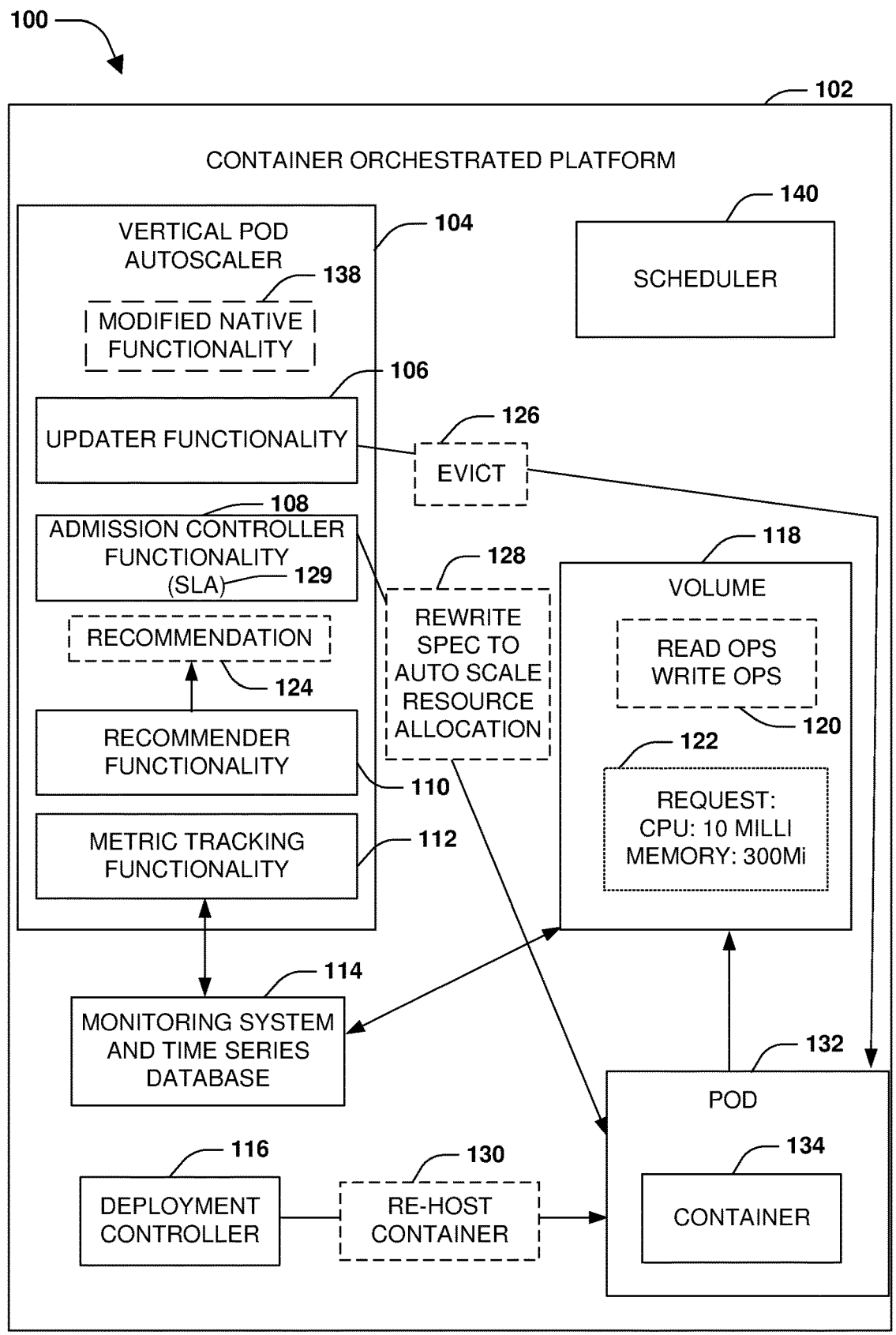
FIG. 1 is a block diagram illustrating an embodiment of a set of components that may be used for resource consumption monitoring and dynamic resource allocation for containers in accordance with various embodiments of the present technology.

The techniques described herein are directed to dynamic and/or optimal resource allocation based on input/output operations per second (IOPS) and throughput monitoring. The demands on data center infrastructure and storage are changing as more and more data centers are transforming into private and hybrid clouds. Storage solution customers are looking for solutions that can provide automated deployment and lifecycle management, scaling on-demand, higher levels of resiliency with increased scale, and automatic failure detection and self-healing. To meet these objectives, a container-based distributed storage architecture can be leveraged to create a composable, service-based architecture that provides scalability, resiliency, and load balancing. The container-based distributed storage architecture may provide a scalable, resilient, software defined architecture that can be leveraged to be the data plane for existing as well as new web scale applications. The container-based distributed storage architecture may include a container orchestration platform, such as Kubernetes.

Applications and services may be deployed as containers within the container orchestration platform in a scalable and on-demand manner. For example, instances of a file system service (e.g., a fault-tolerant, scalable storage platform for creating a cloud-based file system capable of supporting on or more file access protocols, NetApp Cloud Volume Service, etc.) may be hosted on-demand through any number of containers within the container orchestration platform. The file system service may be accessed by clients in order to store and retrieve data within storage accessible through the container orchestration platform, such as through a volume.

A pod may be used to run and manage containers from the perspective of the container orchestration platform. The pod may be a smallest deployable unit a computing resources that can be created and managed by the container orchestration platform. The pod may support multiple containers and forms a cohesive unit of service for the applications hosted within the containers. That is, the pod provides shared storage, shared network resources, and a specification for how to run the containers grouped within the pod. For example, the pod may encapsulate an application, such as the file system service, composed of multiple co-located containers that share resources. These co-located containers form a single cohesive unit of service provided by the pod, such as where one container provides clients with access to files stored in a shared volume and another container updates the files on the shared volume. The pod wraps these containers, storage resources, and network resources together as single unit that is managed by the container orchestration platform.

In an embodiment, a file system service within a first container may access a deduplication application within a second container and a compression application within a third container in order deduplicate and/or compress data managed by the file system service. Because these applications cooperate together, a single pod may be used to manage the containers hosting these applications. These containers that are part of the pod may be co-located and scheduled on a same node, such as the same physical hardware or virtual machine. This allows the containers to share resources and dependencies, communicate with one another, and/or coordinate their lifecycles of how and when the containers are terminated.

A node may host multiple containers, and one or more pods may be used to manage these containers. For example, a first pod within the first node may manage a container and/or other containers hosting applications that may interact with one another. A second pod within a second node may manage a first container, a second container, and a third container hosting applications that may interact with one another. A container may be used to execute applications (e.g., a Kubernetes application, a client application, etc.) and/or services such as the file system service that provides clients with access to storage hosted or managed by the container orchestration platform. The file system service may be accessed by clients in order to store and retrieve data within storage of the storage platform. For example, the file system service may be an abstraction for a volume, which provides the clients with a mount point for accessing data stored through the file system service in the volume.

In some cases, the container orchestration platform may be designed and tailored for hosting applications in a manner where the applications can be migrated amongst containers and nodes (e.g., virtual machines) without worrying about tracking a state of an application's execution. For example, an application may be initially hosted in a first container. In order to migrate the application, the first container may be deconstructed (e.g., deallocated from memory), and the application may be re-hosted in a second container on the same or different node.

However, migrating containers and nodes within the container orchestration platform may be problematic for applications and services that are stateful (e.g., a file system service managing a volume being accessed by clients). These applications and services have state information (e.g., information about a volume mounted for client access, information about input/output operations per second, etc.) that is not natively tracked by the container orchestration platform. Without this state information, resources cannot be dynamically scaled up or down because there is no resource utilization state information being tracked by the container orchestration platform. That is, the container orchestration platform does not track this state information, which may be indicative of resource consumption. Without this resource consumption information, there is no resource consumption data points and trends that could otherwise be used to determine how much to scale up or down resource allocations. The inability to dynamically scale resources often leads to overprovisioning of nodes (e.g., virtual machines) hosting containers, thus leading to wasted resources and sub-optimal resource utilization. For example, memory and processor resources may be overprovisioned for a container (e.g., a container executing the file storage service) to ensure that operation of the container satisfies service level agreements (SLAs) guaranteed to clients.

Resource scaling functionality (e.g., a vertical pod autoscaler) may also be limited to managing resource allocations for objects that are natively supported by the container orchestration platform. The traditional resource scaling functionality cannot understand the format of custom objects that are not natively supported by the container orchestration platform, such as the volume managed by the file system service. Thus, the volume managed by the file system service may be defined as a custom object through a custom resource definition (CRD), as opposed to being a natively defined object of the container orchestration platform.

In particular, in a Kubernetes cluster, a resource is an endpoint that provides the ability to store any type of API object. A custom resource provides the ability to extend native Kubernetes capabilities (beyond standard objects natively supported by Kubernetes) by creating and adding any type of API object as a custom object. For example, Kubernetes may natively provide a Kubernetes volume as a directory or block device mounted inside a container running in a pod. This Kubernetes volume is a native Kubernetes object, and is not a custom object defined through a custom resource definition. Kubernetes volumes represent physical devices managed by Kubernetes. Various embodiments can use a custom resource definition to extend native Kubernetes capabilities in order to define and create a volume as a custom object that can be used by an application. This volume may be referred to as a volume custom object that is not a native Kubernetes object. This provides the ability to extend Kubernetes capabilities beyond the default native Kubernetes capabilities and standard objects natively supported by Kubernetes. In some embodiments, the custom resource definition may be created through a .yaml file, and comprises various fields used to define the volume custom object.

In some embodiments, the volume custom object is an abstraction of a write anywhere file layout volume. The write anywhere file layout volume stores metadata and data in files. The metadata, such as inodes and block maps indicating which blocks in the write anywhere file layout volume are allocated, are not stored in fixed locations. A top-level file in the write anywhere file layout volume is an inode file comprising inodes for all other files. A root inode for this inode file is stored in a block having a fixed location. An inode for a relatively small file contains the file contents. Otherwise, an inode for a relatively larger file contains a list of pointers to file data blocks comprising the actual data of the file. The pointers may have many layers of indirect blocks forming a tree of blocks that can be traversed to reach the data blocks of the actual data. These data blocks and indirect blocks (metadata blocks) of the write anywhere file layout volume are stored in files. The root inode can be used to locate all of the blocks of these files. With the write anywhere file layout volume, data may be written anywhere on disk, and is not stored at pre-determined fixed locations. Kubernetes does not support or understand the concept of this write anywhere file layout volume. Accordingly, the volume custom object may be an abstraction of this particular type of write anywhere file layout volume, which is defined through a custom resource definition so that the write anywhere file layout volume can be defined to operate similar to the write anywhere file layout volume, while being hosted within the container orchestration platform of Kubernetes. The volume custom object uses underlying Kubernetes volumes to store the actual data of the volume custom object. The volume custom object can be mounted from various types of client devices, such as a Linux or Windows client device.

Accordingly, as provided herein, a traditional vertical pod autoscaler (e.g., resource scaling functionality) is modified with the ability to interpret custom objects that are not natively supported by the container orchestration platform. The traditional vertical pod autoscaler is an autoscaling tool that helps size pods for optimal CPU and memory resources required by the pods. Instead of a user having to continually set up-to-date CPU requests and limits and memory requests and limits for containers in the pods, the traditional vertical pod autoscaler can be configured to determine and set recommended values for CPU and memory request and limits, which may be automatically updated. In order to determine and set these recommended values, the traditional pod autoscaler must be able to understand and interpret the objects being used by the containers of the pods. However, the traditional vertical pod autoscaler may not include native functionality to understand and interpret the concept, format, and/or parameters of a volume that is defined as a custom object not natively supported by the container orchestration platform.

In contrast, various embodiments of the present technology modify a traditional vertical pod autoscaler to understand and interpret the concept, format, and/or parameters of a volume that is defined as a custom object not natively supported by the container orchestration platform. In accordance with some embodiments, the volume may be implemented as a custom resource definition (CRD) that may be specific to a file system service that provides clients with mountable access to the volume for data storage. Thus, this volume may be referred to as a volume custom object that is not a native Kubernetes object. In this way, the traditional vertical pod autoscaler may be modified as a modified vertical pod autoscaler with additional functionality capable of interpreting the custom resource definition of the volume (e.g., interpreting parameters of the volume, tracking metrics associated with access to the volume, etc.). That is, the traditional pod autoscaler does not work with (is not compatible with) non-native Kubernetes objects such as the volume custom object defined through the custom resource definition.

Accordingly, code modifications have been implemented to modify the native functionality of the traditional vertical pod autoscaler with additional functionality so that the vertical pod autoscaler is now compatible with the volume custom object. In some embodiments, the additional functionality is capable of utilizing metrics (e.g., I/O usage metrics of a pod/container) that are pushed to a monitoring system and time series database and are used to determine whether recommendations should be prevented because input/output operations per second (IOPS) and throughput limits have been reached. For example, a recommendation to schedule/host a pod on a particular virtual machine may be prevented if IOPS and throughput limits of the virtual machine have already been reached. The additional functionality modifies a traditional recommendation algorithm to handle bursty I/O. If a pod has low activity, then a resource allocation to the pod may scale down. In the event of increased traffic on the pod, then the modified recommendation algorithm can scale up resource allocation to the pod rapidly to accommodate this bursty I/O.

With this modification, the vertical pod autoscaler may now be capable of monitoring access to the volume and resource utilization associated with the volume, such as memory resource utilization, processor resource utilization, and/or input/output operations per second (IOPS) and throughput. This is because the vertical pod autoscaler is modified with functionality that can understand and parse the custom resource definition of the volume in order to understand how to monitor and track these metrics. For example, the custom resource definition may define and specify how to track memory and/or processor utilization of a container hosting the file system service managing the volume, a pod running the container, and/or a virtual machine hosting the pod. The custom resource definition may define and specify how to track client access provided to the volume through the container, such as IOPS of the container to the volume.

Using the historic memory and processor utilization tracked by the vertical pod autoscaler, the vertical pod autoscaler may now be capable of generating and/or executing recommendations of memory and processor allocations for a container providing access to a custom resource (e.g., a container hosting a file system service managing a volume). The vertical pod autoscaler generates and executes these recommendations to ensure proper execution of applications and to efficiently utilize resources. If resources assigned to a pod are smaller than requirements of workloads performed by applications hosted as containers of the pod, then the applications may fail due to running out of resources or will be throttled, which can result in degraded performance. If the resources assigned to the pod are much larger than the requirements of workloads, then the resources are wasted. Accordingly, the vertical pod autoscaler can generate recommendations of memory and processor allocations that meet or exceed the historic memory and processor utilization by the pod to ensure that an adequate amount of resources are assigned to the pod.

The vertical pod autoscaler and a scheduler may also improve resource utilization by using historic IOPS and throughput consumed by pods running instances of the file system service, such as a file system in user space (FUSE) where a storage file system is packaged into a Linux user space. This historic IOPS and throughput is used as a consideration for how to redeploy the pods amongst virtual machines for more efficient resource consumption by the virtual machines. In particular, the scheduler (a default kube-scheduler) is modified with a custom filter that takes IOPS and throughput as an input for filtering out virtual machines in order to select a virtual machine for hosting a pod. The scheduler utilizes the custom filter to select a particular virtual machine to host a pod based upon how much remaining IOPS and throughput would be available in the virtual machine if the virtual machine hosted the pod. The custom filter takes available IOPS of the virtual machines and historic IOPS and throughput consumed by the pod as input. With this input, the scheduler uses the custom filter to select a virtual machine that will have the smallest remaining available IOPS after hosting the pod. For example, the custom filter may be used to filter out virtual machines that would have relatively larger amounts of IOPS remaining if the virtual machines would host the pod. In this way, the custom filter may be used to identify and select a virtual machine that may have the least amount of remaining IOPS if the virtual machine hosted the pod.

In some embodiments of modifying the default kube-scheduler, a scheduler-extender mechanism is used to create a new callback that is called to augment an existing filter mechanism that is part of a default kube-scheduler. The new callback is used to filter virtual machines (nodes) that match certain constraints. The default kube-scheduler's native filter does not consider IOPS and throughput constraints when selecting or filtering a given virtual machine (node). The native filter has been modified to create a custom filter that augments the default functionality of the kube-scheduler to now consider available IOPs and throughput when filtering virtual machines. The custom filter may implement a filtering algorithm to obtain I/O usage metrics of a pod (or container) and a virtual machine from the monitoring system and time series database over a particular time period. The filtering algorithm obtains available IOPS and throughput capacity of all available pods based upon metrics retrieved from the monitoring system and time series database. Estimated IOPS and throughput of the pod is determined based upon the metrics retrieved monitoring system and time series database. A buffer value may be added to the estimated IOPS and throughput of the pod to account for potential burstiness. If multiple virtual machines match the estimated (required) IOPS and throughput of the pod, then a particular virtual machine may be selected and returned by the kube-scheduler. This virtual machine may be a virtual machine whose available capacity closest matches estimated (required) IOPS and throughput of the pod, which may minimize the available IOPS and throughput capacity of all available pods minus the estimated (required) IOPS and throughput of the pod.

In some embodiments, this scheduling mechanism uses a best-fit bin packing scheme to pack pods into virtual machines in order to efficiently utilize resources with minimal increase in client latencies (e.g., assigning too many pods to a virtual machine may result in unacceptable client latency). This best-fit bin packing scheme assigns pods to virtual machines in a manner that utilizes resources of the virtual machines to the fullest extent possible with little to no wasted/unutilized resources. For example, if a first virtual machine has 100 milli CPU and 300 Mi memory, then the best-fit bin packing scheme may pack as many pods as possible into the first virtual machine to get as close to but not exceeding the 100 milli CPU and the 300 Mi memory. Additional, pods may be redeployed from a virtual machine to other virtual machines so that the virtual machine can be deconstructed to save resources otherwise assigned to the virtual machine.

Various embodiments of the present technology provide for a wide range of technical effects, advantages, and/or improvements to computing systems and components. For example, various embodiments may include one or more of the following technical effects, advantages, and/or improvements: 1) modifying native functionality of a vertical pod autoscaler to be able to interpret and monitor custom objects (e.g., a volume managed by a file system service) that are otherwise not natively supported by a container orchestration platform; 2) configuring the vertical pod autoscaler to interpret a custom resource definition (CRD) of a volume in order to monitor resource utilization (e.g., memory utilization, processor utilization, IOPS, throughput, etc.) associated with the volume; 3) utilizing unconventional and non-routine systems and techniques to automatically scale up or down resource allocations to containers associated with custom resources (e.g., a container hosting a file system service managing a volume) for improve resource consumption, efficiency, and to satisfy service level agreement (SLA) guarantees; 4) extending an existing Kubernetes scheduler with a custom filter so that the scheduler takes historic IOPS and throughput consumed by pods into account when scheduling pods to run on virtual machines; 5) utilizing unconventional and non-routine systems and techniques to assign pods to virtual machines in a manner that more efficiently consumes available IOPS and throughput of the virtual machines using a best fit bin packing mechanism; 6) enabling the scaling of stateful applications, and 7) redeploying pods amongst virtual machines so that virtual machines no longer hosting pods after the redeployment may be deconstructed to conserve resources otherwise consumed by the virtual machines.

One embodiment of resource consumption monitoring for dynamic resource allocation for containers is illustrated by system 100 of FIG. 1. A container orchestrated platform 102, such as Kubernetes or other containerized environment, may be configured to host containers within which applications and services may be hosted. A pod 132 may run and manage a container 134 executing a file system service that provides users with access to a custom object, such as a volume 118. The volume 118 may be defined through a custom resource definition (CRD) as a custom object that is not be natively supported by the container orchestrated platform 102. The fields within the CRD may comprise an API version field defining a schema of a representation of the custom object, a kind field representing a REST resource that the custom object represents, a metadata field, a spec field described how the custom object is to appears, and/or a status field indicating a state of the custom object. The fields may also comprise a scope field indicating whether the custom object is cluster or namespace scoped, a versions field listing API versions of the custom object, a names field specifying names used to discover the custom object, a group field corresponding to an API group that includes the custom object, and/or other fields that are user defined. The resource scaling functionality cannot provide resource management for the volume and/or other custom objects because the resource scaling functionality cannot understand or interpret these custom objects that are defined through custom resource definitions. This is because the resource scaling functionality is limited to natively understanding and interpreting the standard objects that are part of the native Kubernetes capabilities.

Because the container orchestrated platform 102 does not natively support custom objects, a vertical pod autoscaler 104 of the container orchestrated platform 102 may not be able to natively monitor and/or manage resource allocations for the custom objects such as the volume 118. Accordingly, as provided herein, the native functionality of the vertical pod autoscaler 104 is modified with functionality (modified native functionality 138) capable of interpreting the custom resource definition of custom objects such as the volume 118 that is defined as a custom object through a custom resource definition. The ability to interpret the custom resource definition allows the vertical pod autoscaler 104 to understand and track various resource utilization metrics associated with the volumes 118 (e.g., memory and processor utilization and/or IOPS consumed by the pod 132 running the container 134) in order to efficiently scale up and down resource allocation.

The vertical pod autoscaler 104 executes metric tracking functionality 112 to track memory and processor utilization by the container 134 accessing the volume 118. For example, the vertical pod autoscaler 104 may track memory and processor utilization associated with read and write operations 120 executed upon the volume 118 by the container 134. The vertical pod autoscaler 104 may store the memory and process utilization information within a monitoring system and time series database 114. The monitoring system and time series database 114 may comprise functionality capable of responding to time-based queries, such as with historic resource utilization over a particular time period by the container 134 accessing the volume 118. These time-based queries may be issued by the vertical pod autoscaler 104, the schedule 140, and/or the deployment controller 116 for determine resource consumption over time periods specified by the time-based queries. In accordance with various embodiments, the monitoring system and time series database 114 stores historical data about a file storage system. The monitoring system and time series database 114 supports queries that include a specified time limit (e.g., 50 seconds, 10 minutes, 5 days, 7 weeks, etc.) and one or more raw or synthetic parameters of the system. For example, the time series database 114 may output an answer of 5,000 IOPS based upon a time-based query of "what is the average IOPS consumed over the last 10 minutes."

The vertical pod autoscaler 104 executes recommender functionality 110 to query the monitoring system and time series database 114 for historic memory and processor utilization by the container 134 over a time period. The vertical pod autoscaler 104 utilizes the historic memory and processor utilization to generate a recommendation 124 of memory and processor allocations for the container 134. In particular, a recommender of the vertical pod autoscaler 104 periodically runs (e.g., every minute) to provide a recommendation. A query for a recommendation may correspond to: average(IOPS, throughput) for the last n minutes (e.g., 5 minutes), where n is a tunable value. In some embodiments, the vertical pod autoscaler 104 may take CPU utilization samples every minute, which may be stored in a metrics server. The peak memory utilization for a time interval (e.g., a 24-hour interval) may be stored in the metrics server. When the recommender runs, the recommender takes this information and computes a target estimation (a target recommendation), a lower bound limit, and an upper bound limit.

In some embodiments, a target estimation (a target recommendation) is calculated for inclusion within the recommendation 124. The target estimation may be calculated based upon a target percentile amount (e.g., 90th percentile amount) applied to the historic memory and/or processor utilization with a target safety margin (e.g., 15% safety margin). For example, the target estimation may be calculated as $4.1*(1+0.15)=4.715$, where 4.1 is a 90th percentile amount of historic resource utilization and 0.15 is a 15% safety margin. If current utilization is at a difference of some threshold percentage, then the pod is evicted and the target estimation is applied. In some embodiments, the target estimation may correspond to an ideal target recommendation. That is, the target estimation for CPU and memory is used as new values for CPU and memory for a pod. The target estimation may be an ideal target recommendation of CPU and memory usage of the system (pod) at a point in time or an ideal value based on CPU and memory usage samples collected thus far. However, this may or may not be an optimal recommendation for the system. The vertical pod autoscaler 104 depends upon historical data, and thus there could be some variance such that initial recommendations by the vertical pod autoscaler 104 may be slightly higher. However, as more and more samples are accumulated, the accuracy of the target estimations (target recommendations) become closer to actual usage of the system (pod). For example, samples of CPU and memory usage may be collected at times T1-T4, such as T1: CPU 2 and memory 2, T2: CPU 3.5 and memory 2.5, T3: CPU 2.1 and memory 2.1, and T4: CPU 2.15 and memory 2.1. At time T5, the recommender runs. The CPU utilization value at T2 is significantly higher than at other times, so the recommender might recommend a slightly higher CPU recommendation value than what the system exactly needs. However, over estimation may be constrained because an upper bound limit may be based upon an upper bound percentile amount (e.g., a 95th percentile amount).

In some embodiments, a lower bound limit may be calculated for inclusion within the recommendation 124. The lower bound limit may be calculated based upon a lower bound percentile amount (e.g., 50th percentile amount) applied to the historic memory and/or processor utilization with a lower bound safety margin (e.g., 15% safety margin) and multiplied by a confidence factor (e.g., $0.997=(1+0.001/\text{history-length-in-days})\hat{\ }-2$, where history-length-in-days is 7). For example, the lower bound limit may be calculated as $1.8*(1+0.15)*0.997=3.21$, where 1.8 is a 50th percentile amount, 0.15 is a 15% safety margin, and 0.997 is a confidence factor. In an embodiment, a minimum allowed cap may be applied to the lower bound limit based upon a container policy specifying a minimum amount of resources that are to be allocated (e.g., resource allocation below the minimum allowed cap may result in operational errors because the container 134 may not be allocated a minimum amount of resources necessary for proper operation or to meet SLA guarantees). In this way, the lower bound limit cannot be less than the minimum allowed cap. The lower bound limit may be used to determine whether to evict the container 134 based upon the container requesting 122 resources that violate the lower bound limit. In some embodiments, the lower bound limit may correspond to a lowest possible resource allocation below which a pod cannot run.

In some embodiments, an upper bound limit may be calculated for inclusion within the recommendation 124. The upper bound limit may be calculated based upon an upper bound percentile amount (e.g., 95th percentile amount) applied to the historic memory and/or processor utilization with an upper bound safety margin (e.g., 15% safety margin) and multiplied by a confidence factor (e.g., $1.14=(1+1/\text{history-length-in-days})$, where history-length-in-days is 7). For example, the upper bound limit may be calculated as $4.3*(1+0.15)*1.14=5.64$, where 4.3 is a 95th percentile amount, 0.15 is a 15% safety margin, and 1.14 is a confidence factor. In an embodiment, a maximum allowed cap may be applied to the upper bound limit based upon a container policy specifying a maximum amount of resources that are to be allocated (e.g., exceeding the maximum allowed cap may result in additional costs incurred from a third-party storage provider hosting the container orchestrated platform 102). In this way, the upper bound limit cannot exceed the maximum allowed cap. In some embodiments, the upper bound limit may correspond to a highest amount of resources that a particular pod is allowed to consume.

The vertical pod autoscaler 104 may determine whether a current memory and/or processor allocation (e.g., the request 122 for 100 milli CPU and 300 Mi memory) for the container 134 does not satisfy the recommendation 124. For example, the vertical pod autoscaler 104 may determine whether the amount of memory and/or processor resources requested by the request 122 exceeds the upper bound limit or the lower bound limit. If the upper bound limit and/or the lower bound limit would not be exceeded, then the pod continues to run the container 134. In this way, the request 122 of the current memory and processer allocation is granted for the container 134.

In some embodiments, if the historic memory and processor utilization exceeds a threshold (e.g., CPU utilization increased from 0.5 CPUs to 0.7 CPUs, which may exceed a 1% threshold or any other threshold set for the vertical pod autoscaler), then the container may be evicted (e.g., deconstructed and removed from memory). In some embodiments, if the upper bound limit and/or the lower bound limit would be exceeded, then the vertical pod autoscaler 104 may implement updater functionality 106 to evict 126 the container 134. In some embodiments, the container 134 may be evicted 126 by stopping the container orchestrated platform 102 from executing the pod 132 that runs the container 134. When the container 134 is evicted 126, the container 134 is placed into a queue. A scheduler 140 is configured to process queued containers within the queue for scheduling the containers to be hosted through pods within the container orchestrated platform 102. In some embodiments, a pod (or container) is evicted if a current resource utilization of the pod is a difference of some threshold percentage, and thus the target estimation (target recommendation) is applied. For example, a current CPU allocation may be 3 and the threshold may be 10%. Accordingly, if CPU usage is in the 90th percentile (e.g., 90th percentile of 2.7=3*10/100), then the pod may be evicted and a new CPU consumption value is obtained based upon the previously described formula relating to the target estimation. Thus, the pod may be evicted without breaching the upper bound limit and the lower bound limit, in some embodiments.

Once evicted, a specification for the container may be rewritten based upon a recommendation of increased memory and processor allocations. The specification may comprise instructions for how to run containers of a pod. The specification may specify a name of a container, an image comprising application code and runtimes (e.g., libraries) to be run by the container, commands to be run by the container, network information of the container such as a port of the container, a CPU allocation attribute, a memory allocation attribute, and/or other information. In this way, the container may be re-hosted based upon the rewritten specification. This resource management technique provides the ability to initially thin provision a container (e.g., provision the container a relatively small amount of resources), and then incrementally increase resource allocations on-demand on an as needed basis based upon monitored resource utilization. Similarly, if the historic memory and processor utilization is below a threshold, then the specification can be rewritten based upon a recommendation of decreased memory and processor allocations. In this way, resources are efficiently allocated and reallocated in a dynamic on-demand manner based upon monitored resource utilization, and can be performed in an automated manner that is transparent to the end user of the system.

In response to the container 134 being evicted 126, the vertical pod autoscaler 104 may implement admission controller functionality 108 to rewrite 128 a specification for the container 134 to automatically scale resource allocation to the container 134. In some embodiments, the specification is rewritten with requests and limit values that are derived from the recommendation 124 in order to satisfy a service level agreement (SLA) guarantees 129 and improve resource consumption and efficiency. In some embodiments, a request may be used to bind the scheduler 140 of the container orchestrated platform 102 to reserve a set amount of resources, specified in the request of the rewritten specification, for running the container 134.

In some embodiments, the container 134 may be allowed to utilize more resources than the set amount of resources reserved by the scheduler 140. In some embodiments, the request may be derived from the target estimation included within the recommendation 124. In some embodiments, a limit value may correspond to a resource usage limit that cannot be surpassed by the container 134. In some embodiments, a first limit value may correspond to the upper bound limit in the recommendation 124 and a second limit value may correspond to a lower bound limit in the recommendation 124. If the container 134 attempts to access or request resources beyond the resource usage limit specified by a limit value, then the container may be evicted. When the container 134 is evicted, the container 134 is placed into a queue. The scheduler 140 is configured to process queued containers within the queue for scheduling the containers to be hosted through pods within the container orchestrated platform 102. In some embodiments, the container 134 may be evicted based upon the target estimation being a threshold amount greater (e.g., 10% greater) than a current resource request 122 by the container 134. In some embodiments, a cool-off period may be applied between two evictions (e.g., a gap between two successive evictions is to be 12 hours apart).

A deployment controller 116 re-hosts 130 the container 134 through the pod 132 or a different pod. The container 134 may be re-hosted 130 on a same node (e.g., virtual machine) as before eviction 126 or a different node. The deployment controller 116 may be triggered to re-host 130 the container 134 based upon the container 134 reaching a front of the queue and being processed/scheduled by the scheduler 140 for being re-host 130 based upon the rewritten specification. The container 134 is re-hosted 130 based the rewritten specification such that resources may be allocated for the container 134 based upon the target estimation. Also, the upper bound limit and/or the lower bound limit may be enforced for the container 134.

In some embodiments, error recovery for the vertical pod autoscaler 104 may be implemented. During normal operation of the vertical pod autoscaler 104, checkpointing may be implemented. As part of checkpointing, checkpoint values are created to store data values that are used in computations by the vertical pod autoscaler 104, such as IOPS, throughput, I/O read and write sizes, CPU utilization, memory utilization, and/or a variety of other data values used by the vertical pod autoscaler 104. A failure of the vertical pod autoscaler 104 may be detected, such as based upon a loss of a heartbeat, a timeout occurring without receiving a response from the vertical pod autoscaler 104 in response to a request, an alert provided by the container orchestrated platform 102 of the failure, etc. Accordingly, when the vertical pod autoscaler 104 recovers from the failure, the checkpoint values may be provided to the vertical pod autoscaler 104 for reuse as a basis of subsequent computations. If the vertical pod autoscaler 104 is not behaving as expected (e.g., the vertical pod autoscaler 104 is not correctly scaling resource allocations or creating correct recommendations), then a pod may be opted out from using the vertical pod autoscaler 104 for resource scaling.

In some embodiments, pod state transitions and recommendations may be implemented by the vertical pod autoscaler 104. The vertical pod autoscaler 104 may determine a current state of the pod 132, such as an active state (e.g., CPU usage is greater than about 80% of usage), a moderate state (e.g., CPU usage is between about 20% and 80% of usage, such as between 40% and 50% of usage), a dormant state (e.g., CPU usage is less than 20% of usage), or a burst state where the pod 132 is experiencing a sudden burst of traffic (bursty traffic). Various recommendations may be generated based upon whether a state of the pod 132 has changed. For example, an initial CPU allocation may be 4 and an initial memory allocation may be 15. If the pod 132 has been active for 8 days (an active state) and then less active for 8 days, then a recommendation may be created to set a target CPU allocation to 3.86 and a target memory allocation to 15.03 or any other set of values. One or more evictions of the pod 132 and/or additional recommendations of values may be implemented. If the pod 132 has been active for 8 days (an active state) and then dormant for 8 days (a dormant state), then a recommendation may be created to set a target CPU allocation to 1 and a target memory allocation to 5 or any other set of values. One or more evictions of the pod 132 and/or additional recommendations of values may be implemented. If the pod 132 has been active for 8 days (an active state) and then moderate for 8 days (a moderate state), then a recommendation may be created to set a target CPU allocation to 2.406 and a target memory allocation to 11 or any other set of values. One or more evictions of the pod 132 and/or additional recommendations of values may be implemented. If the pod 132 has been moderate for 8 days (a moderate state) and then active for 8 days (an active state), then a recommendation may be created to set a target CPU allocation to 3.66 and a target memory allocation to 15 or any other set of values. One or more evictions of the pod 132 and/or additional recommendations of values may be implemented.

If the pod 132 has been moderate for 8 days (a moderate state) and then dormant for 8 days (a dormant state), then a recommendation may be created to set a target CPU allocation to 1.93 and a target memory allocation to 8 or any other set of values. One or more evictions of the pod 132 and/or additional recommendations of values may be implemented. If the pod 132 has been dormant for 8 days (a dormant state) and then active for 8 days (an active state), then a recommendation may be created to set a target CPU allocation to 3.67 and a target memory allocation to 15 or any other set of values. One or more evictions of the pod 132 and/or additional recommendations of values may be implemented.

If the pod 132 has been dormant for 8 days (a dormant state) and then moderate for 8 days (a moderate state), then a recommendation may be created to set a target CPU allocation to 2.3 and a target memory allocation to 11 or any other set of values. One or more evictions of the pod 132 and/or additional recommendations of values may be implemented. If the pod 132 has been active for 7 days (an active state), experiences a 2 minute burst state, and then active for 7 days (an active state), then a recommendation may be created to set a target CPU allocation to 4 or any other set of values, and no evictions may be performed. If the pod 132 has been moderate for 7 days (a moderate state), experiences a 2 minute burst state, and then moderate for 7 days (a moderate state), then a recommendation may be created to set a target CPU allocation to 2.28 and a target memory allocation to 11 or any other set of values. One or more evictions of the pod 132 and/or additional recommendations of values may be implemented. If the pod 132 has been dormant for 7 days (a dormant state), experiences a 2 minute burst state, and then dormant for 7 days (a dormant state), then a recommendation may be created to set a target CPU allocation to 1 and a target memory allocation to 5 or any other set of values. One or more evictions of the pod 132 and/or additional recommendations of values may be implemented.

Figure 2:
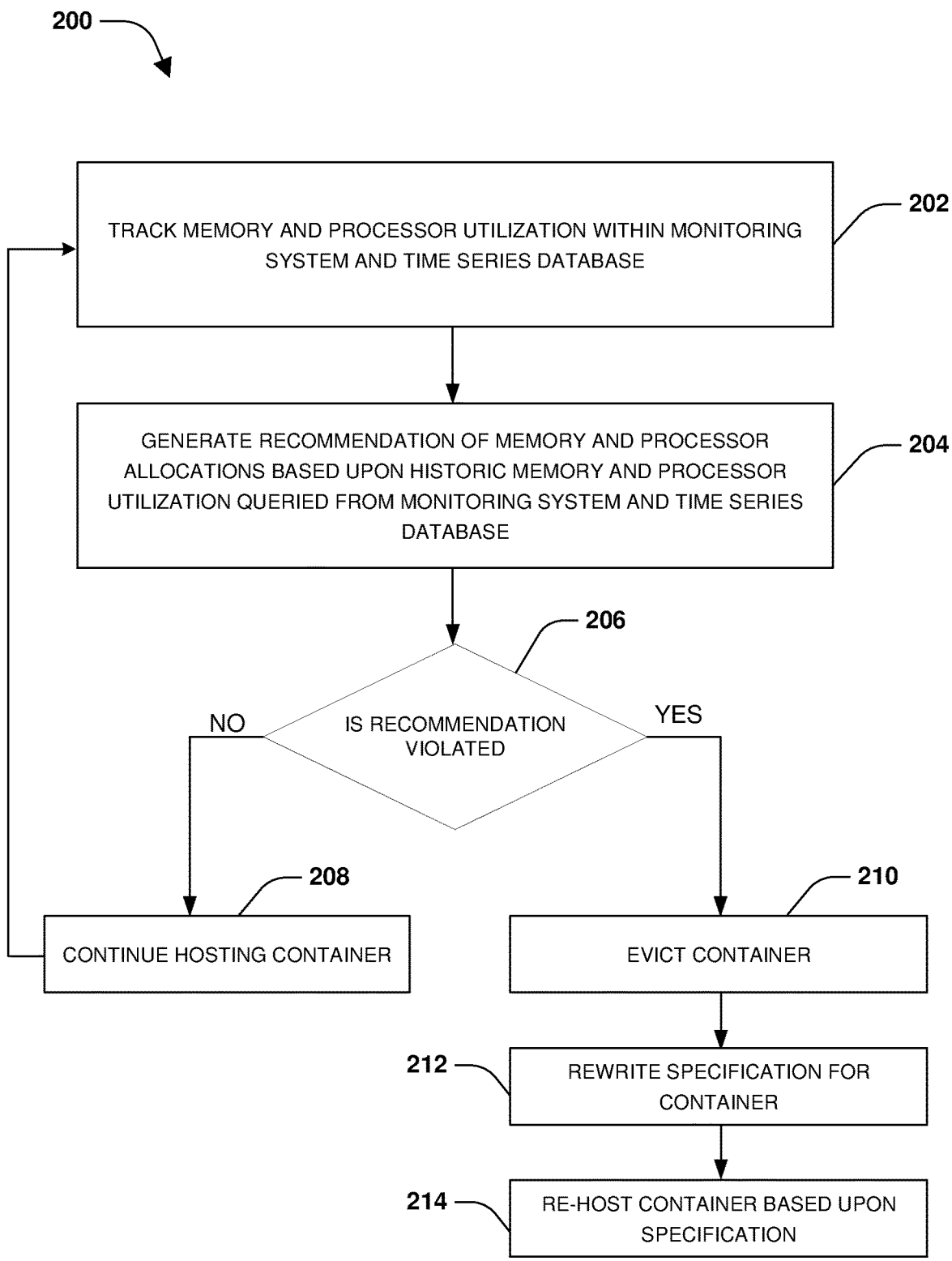
FIG. 2 is a flow chart illustrating an embodiment of a set of operations that can be used for resource consumption monitoring and dynamic resource allocation for containers in accordance with various embodiments of the present technology.

One embodiment of resource consumption monitoring for dynamic resource allocation for containers is illustrated by method 200 of FIG. 2. During operation 202 of method 200, the vertical pod autoscaler 104 executes metric tracking functionality 112 to track memory and processor utilization by the container 134 accessing the volume 118. For example, the vertical pod autoscaler 104 may track memory and processor utilization associated with read and write operations 120 executed upon the volume 118 by the container 134. The vertical pod autoscaler 104 may store the memory and process utilization information within a database.

During operation 204 of method 200, the vertical pod autoscaler 104 executes recommender functionality 110 to query the monitoring system and time series database 114 for historic memory and processor utilization by the container 134 over a time period. The vertical pod autoscaler 104 utilizes the historic memory and processor utilization to generate a recommendation 124 of memory and processor allocations for the container 134. In some embodiments, a target estimation is calculated for inclusion within the recommendation 124. The target estimation may be calculated based upon a target percentile amount (e.g., $91^{st}$ percentile amount) applied to the historic memory and/or processor utilization with a target safety margin (e.g., 20% safety margin).

In some embodiments, a lower bound limit may be calculated for inclusion within the recommendation 124. The lower bound limit may be calculated based upon a lower bound percentile amount (e.g., $50^{th}$ percentile amount) applied to the historic memory and/or processor utilization with a lower bound safety margin (e.g., 20% safety margin) and multiplied by a confidence factor (e.g., 0.992). The lower bound limit may be used to determine whether to evict the container 134 based upon the container requesting 122 resources that violate the lower bound limit. In some embodiments, the lower bound limit may correspond to a lowest possible resource allocation below which a pod cannot run. In some embodiments, an upper bound limit may be calculated for inclusion within the recommendation 124. The upper bound limit may be calculated based upon an upper bound percentile amount (e.g., 96th percentile amount) applied to the historic memory and/or processor utilization with an upper bound safety margin (e.g., 20% safety margin) and multiplied by a confidence factor (e.g., 1.2). In some embodiments, the upper bound limit may correspond to a highest amount of resources that a particular pod is allowed to consume.

During operation 206 of method 200, the vertical pod autoscaler 104 may determine whether a current memory and/or processor allocation for the container 134 does not satisfy the recommendation 124. For example, the vertical pod autoscaler 104 may determine whether the amount of memory and/or processor resources requested by the request 122 exceeds the upper bound limit or the lower bound limit. If the upper bound limit and/or the lower bound limit would not be exceeded, then the pod continues to run the container 134, during operation 208 of FIG. 2. In this way, the request 122 of the current memory and processer allocation is granted for the container 134.

If the upper bound limit and/or the lower bound limit would be exceeded, then the vertical pod autoscaler 104 may implement updater functionality 106 to evict 126 the container 134, during operation 210 of method 200. In some embodiments, the container 134 may be evicted 126 by stopping the container orchestrated platform 102 from executing the pod 132 that runs the container 134. When the container 134 is evicted 126, the container 134 is placed into a queue. A scheduler 140 is configured to process queued containers within the queue for scheduling the containers to be hosted through pods within the container orchestrated platform 102.

In response to the container 134 being evicted 126, the vertical pod autoscaler 104 may implement admission controller functionality 108 to rewrite 128 a specification for the container 134, during operation 212 of method 200. In some embodiments, the specification is rewritten with requests and limit values that are derived from the recommendation 124. In some embodiments, a request may be used to bind the scheduler 140 of the container orchestrated platform 102 to reserve a set amount of resources, specified in the request of the rewritten specification, for running the container 134. In some embodiments, the request may be derived from the target estimation included within the recommendation 124. In some embodiments, a limit value may correspond to a resource usage limit that cannot be surpassed by the container 134. In some embodiments, a first limit value may correspond to the upper bound limit in the recommendation 124 and a second limit value may correspond to a lower bound limit in the recommendation 124.

During operation 214 of method 200, the deployment controller 116 re-hosts 130 the container 134 through the pod 132 or a different pod. The container 134 may be re-hosted 130 on a same node (e.g., virtual machine) as before eviction 126 or a different node. The deployment controller 116 may be triggered to re-host 130 the container 134 based upon the container 134 reaching a front of the queue and being processed/scheduled by the scheduler 140 for being re-host 130 based upon the rewritten specification. The container 134 is re-hosted 130 based the rewritten specification such that resources may be allocated for the container 134 based upon the target estimation. Also, the upper bound limit and/or the lower bound limit may be enforced for the container 134.

Figure 3:
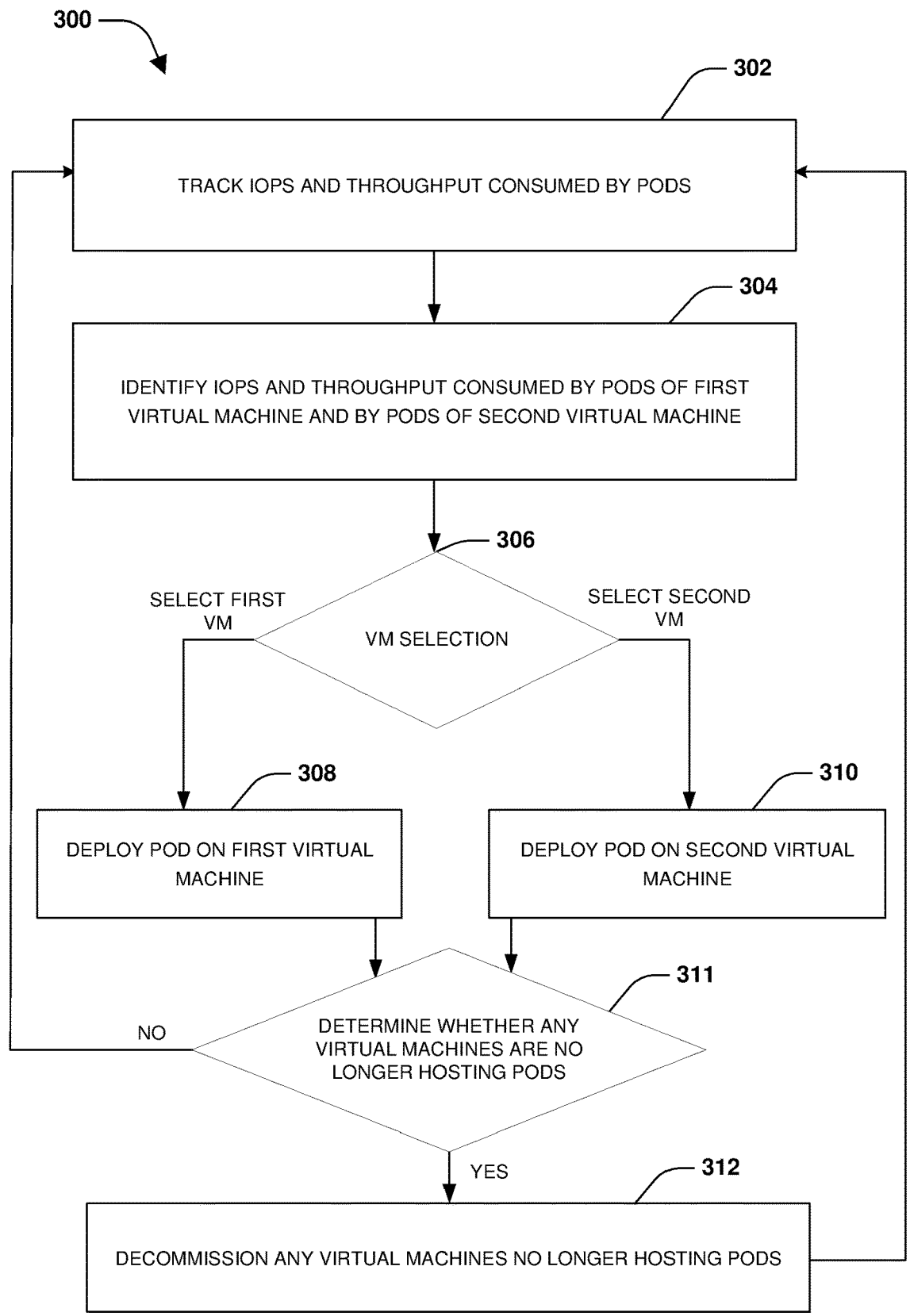
FIG. 3 is a block diagram illustrating an embodiment of a set of operations that may be used for redeploying pods to virtual machines based upon input/output operations per second (IOPS) and throughput considerations in accordance with various embodiments of the present technology.
Figure 4A:
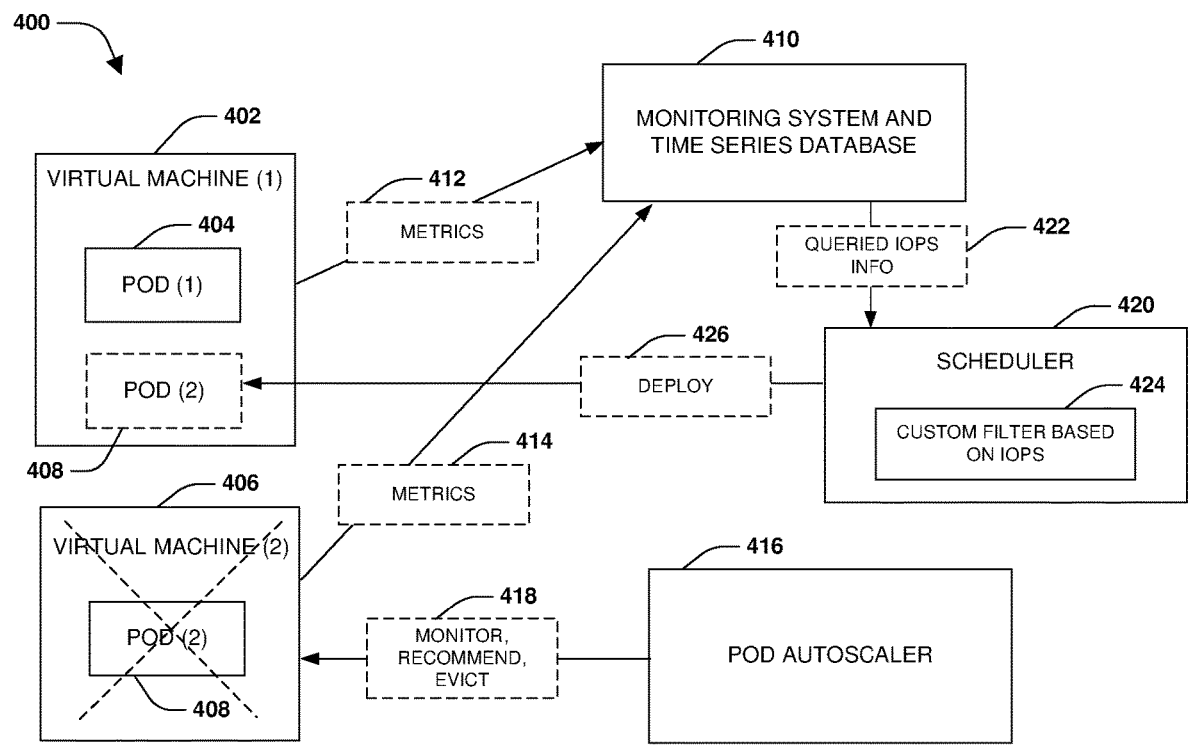
FIG. 4A is a block diagram illustrating an embodiment of a set of components that can be used to redeploy pods to virtual machines based upon IOPS and throughput considerations in accordance with various embodiments of the present technology.
Figure 4B:
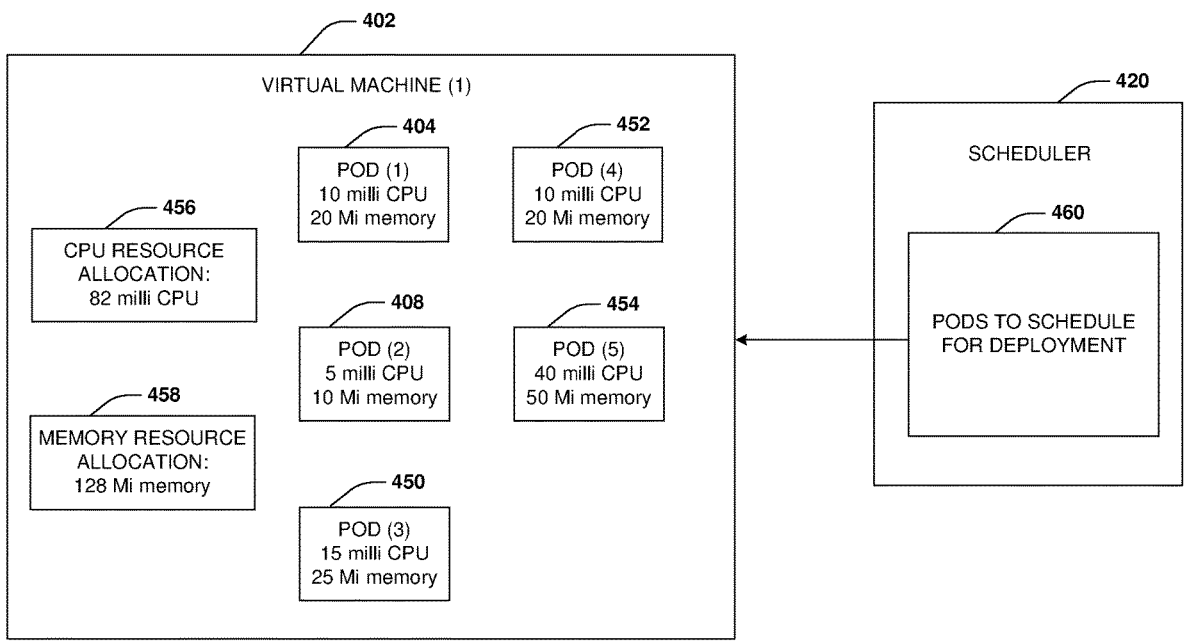
FIG. 4B is a block diagram illustrating an embodiment of a best-fit bin packing scheme in accordance with various embodiments of the present technology.

One embodiment of redeploying pods to virtual machines based upon IOPS and throughput considerations is illustrated by an exemplary method 300 of FIG. 3 and further described in conjunction with system 400 of FIGS. 4A-4C. A container orchestration platform may comprise nodes that may be implemented as virtual machines, such as a first virtual machine 402, a second virtual machine 406, and/or other virtual machines not illustrated. The virtual machines may host pods that run containers. The container may execute applications, services, and/or other functionality. For example, a first pod 404 may be hosted on the first virtual machine 402 and a second pod 408 may be initially hosted on the second virtual machine 406. A vertical pod autoscaler 416 may be configured to monitor 418 resource consumption by the pods, generate recommendations of how to deploy (re-host) pods on virtual machines, and evict pods from virtual machines so the pods can be deployed on different virtual machines.

During operation 302 of method 300, the vertical pod autoscaler 416 tracks IOPS and throughput consumed by the pods within a monitoring system and time series database 410. The monitoring system and time series database 410 may comprise functionality capable of responding to time-based queries, such as with historic IOPS and throughput consumed by pods hosting containers. In an embodiment, IOPS and throughput consumed by the first pod 404 hosted on the first virtual machine 402 may be tracked as metrics 412 within the monitoring system and time series database 410. In an embodiment, IOPS and throughput consumed by the second pod 408 initially hosted on the second virtual machine 406 may be tracked as metrics 414 within the monitoring system and time series database 410. In some embodiments, the IOPS tracked in the monitoring system and time series database 410 may be normalized as a histogram based upon a block size used to store data. For example, the metrics 412 and/or the metrics 414 may be normalized to a 4 kb block size used by containers executing within the first pod 404 and the second pod 408 to store data.

In an embodiment, the histogram may comprise entries listed in the table below:

| | |
|---|---|
| First Entry | disk:disk_summary:dmap_total_write_io_size_hist. <= 212B: 0 IOPS |
| Second Entry | disk:disk_summary:dmap_total_write_io_size_hist. <= 1KB: 0 IOPS |
| Third Entry | disk:disk_summary:dmap_total_write_io_size_hist. <= 2KB: 0 IOPS |
| Fourth Entry | disk:disk_summary:dmap_total_write_io_size_hist. <= 4KB: 760 IOPS |
| Fifth Entry | disk:disk_summary:dmap_total_write_io_size_hist. <= 8KB: 23 IOPS |
| Sixth Entry | disk:disk_summary:dmap_total_write_io_size_hist. <= 16KB: 31 IOPS |
| Seventh Entry | disk:disk_summary:dmap_total_write_io_size_hist. <= 32KB: 52 IOPS |
| Eighth Entry | disk:disk_summary:dmap_total_write_io_size_hist. <= 64KB: 379 IOPS |

The histogram may comprise other entries indicating IOPS for write operations of sizes<=128 kb, write operations of sizes<=256 kb, write operations of sizes<=212 kb, write operations of sizes<=1 mb, etc. The histogram may also comprise entries indicating IOPS for read operations of various sizes.

In some embodiments, the scheduler 420 may process a queue into which pods (e.g., containers to be hosted through pods) are queued for scheduling by the scheduler 420. When a pod (e.g., a container to be hosted by the pod) reaches a front of the queue, the scheduler 420 determines how and where to deploy the pod, such as how much resources to allocate and on what virtual machine to host the pod. The scheduler 420 may be configured with a custom filter 424 used to filter through available virtual machines to select a virtual machine on which to deploy the pod. The custom filter 424 may filter virtual machines based upon historic IOPS and throughput consumed by the pod and/or based upon available IOPS of the virtual machine. Accordingly, during operation 304 of method 300, the scheduler 420 queries 422 the monitoring system and time series database 410 to identify IOPS and/or throughput consumed by pods hosted on the available virtual machines and/or to identify historic IOPS and/or throughput consumed by the pod to be scheduled. For example, the scheduler 420 may identify IOPS and throughput consumed by pods such as the first pod 404 and/or other pods hosted by the first virtual machine 402, IOPS and/or throughput consumed by pods such as the second pod 408 and/or other pods hosted by the second virtual machine 406, and/or IOPS and/or throughput consumed by other virtual machines.

During operation 306 of method 300, the scheduler 420 utilizes the custom filter 424 to determine whether to select the first virtual machine 402 for hosting the pod, the second virtual machine 406 for hosting the pod, or a different virtual machine or a new virtual machine for hosting the pod. As part of this determination, the scheduler 420 determines how much IOPS and/or throughput has historically been or is predicted or specified to be consumed by the pod. The scheduler 420 combines this historic IOPS and/or throughput with the IOPS and/or throughput of the available virtual machines in order to determine how much remaining IOPS each virtual machine would have if the virtual machine hosted the pod. A remaining amount of IOPS on a virtual machine may be determined based upon a historical average IOPS usage by the pod (or predicted or specified IOPS usage if this is the first time the pod will be hosted) and available IOPS of the virtual machine.

The custom filter 424 may be used to filter out virtual machines that would have relatively larger amounts of IOPS remaining if the virtual machines would host the pod. In this way, the custom filter 424 may be used to identify and select a virtual machine that may have the least amount of remaining IOPS if the virtual machine hosted the pod, for example. During operation 308 of method 300, if the first virtual machine 402 is selected by the scheduler 420 using the custom filter 424, then the pod is deployed upon the first virtual machine 402. During operation 310 of method 300, if the second virtual machine 406 is selected by the scheduler 420 using the custom filter 424, then the pod is deployed upon the second virtual machine 406.

In embodiments, the vertical pod autoscaler 416 may determine whether any virtual machines are no longer hosting pods, during operation 311 of method 300. In embodiments, the vertical pod autoscaler 416 may evict pods from a virtual machine so that the pods can be deployed upon other virtual machines and the virtual machine may be decommissioned, during operation 312 of method 300. For example, the vertical pod autoscaler 416 may evict the second pod 408 from the second virtual machine 406. The second pod 408 may be placed within the queue for scheduling by the scheduler 420. The scheduler 420 may utilize the custom filter 424 to determine that the first virtual machine 402 will have the least remaining IOPS out of virtual machines if the first virtual machine 402 would host the second pod 408. Accordingly, the scheduler 420 may deploy 426 the second pod 408 to the first virtual machine 402. The vertical pod autoscaler 416 may decommission the second virtual machine 406 once the second virtual machine 406 is no longer hosting pods, thus improving resource consumption of resources that would otherwise be assigned to the second virtual machine 406.

In some embodiments, a virtual machine may be initially thin provisioned with a first amount of processing and memory resources (e.g., 2 CPUs and 10 GB of memory). The virtual machine is thin provisioned by assigning a relatively low amount of processing and memory resources to the virtual machine. In response to determining that resource utilization by the virtual machine (e.g., 9.5 GB of memory) exceeds a threshold (e.g., 9 GB of memory), the virtual machine may be terminated. A specification for the virtual machine may be modified to have a second amount of processing and memory resources. In some embodiments, the second amount of processing and memory resources may be greater than the first amount of processing and memory resources (e.g., 10 GB of memory). The virtual machine may be restarted with a resource allocation corresponding to the second amount of processing and memory resources specified by the specification. In this way, resources are efficiently allocated to virtual machines by initially thin provisioning the virtual machines and gradually increasing allocations to the virtual machines.

In some embodiments, scaling up may be performed. For example, a recommendation may specify a resource amount greater than a resource allocation of a node hosting a pod that runs a container. A new node with a new resource allocation derived from the recommendation may be created (e.g., the new resource allocation may allocate an amount of processor and memory resources specified by the recommendation). In this way, the pod may be migrated to the new node. In some embodiments, migrating the pod may correspond to deploying a new copy of the pod.

FIG. 4B illustrates implementation of a best-fit bin packing scheme. The scheduler 420 may maintain a queue 460 of pods to schedule for deployment within virtual machines of a container orchestration platform. The scheduler 420 may select one or more pods to deploy onto the first virtual machine 402 based upon the best-fit bin packing scheme. The best-fit bin packing scheme is used to select pods from the queue 460 based upon CPU and memory requirements of the pods so that the combination of pods deployed to the first virtual machine 402 have a total CPU and memory requirements closest to but not exceeding a CPU resource allocation 456 and a memory resource allocation 458 of the first virtual machine 402. For example, the first virtual machine 402 may be assigned the CPU resource allocation 456 of 82 milli CPU and the memory resource allocation 458 of 128 Mi memory. The best-fit bin packing scheme will select a combination of pods from the queue 460 to deploy to the first virtual machine 402 such that a total CPU requirement of the combination of pods is closest to but not exceeding 82 milli CPU compared to any other combination pods that could be selected from the queue 460. The best-fit bin packing scheme will select the combination of pods from the queue 460 to deploy to the first virtual machine 402 such that a total memory requirement of the combination of pods is closest to but not exceeding 128 Mi memory compared to any other combination pods that could be selected from the queue 460. For example, the best-fit bin packing scheme selects the first pod 404, the second pod 408, a third pod 450, a fourth pod 452, and a fifth pod 454 from the queue 460 because the total CPU requirement (80 milli CPU) of this combination of pods is closest to but not exceeding 82 milli CPU compared to any other combination pods that could be selected from the queue 460. Additionally, the best-fit bin packing scheme selects the first pod 404, the second pod 408, a third pod 450, the fourth pod 452, and the fifth pod 454 from the queue 460 because the total memory requirement (125 Mi memory) of this combination of pods is closest to but not exceeding 128 Mi memory compared to any other combination pods that could be selected from the queue 460.

In some embodiments of the best-fit bin packing scheme, the best-fit bin packing scheme may be implemented for cost-reduction by packing multiple pods in a single virtual machine when the cumulative resource usage of the pods are just enough to fit into a single virtual machine. This reduces the number of virtual machines required to host the pods. In addition, this best-fit bin packing scheme cuts costs by packing pods into a smaller sized virtual machine when possible. One challenge with packing multiple pods into a single virtual machine is to achieve a good balance between cost savings and the time required to upscale a pod during a surge. If a packing scheme is too conservative, then the packing scheme will end up too hosting few pods per virtual machine. This, in turn, will increase the total number of virtual machines required to host all the pods, thus resulting in increased costs.

If the packing scheme is too aggressive, then the packing scheme will end up packing too many pods in a single virtual machine leaving very little headroom (e.g., free CPU cores) available for the pods to grow. When a pod experiences a surge in I/O usage, then there may not be enough resources left in the virtual machine for the pod to consume close to the pod's limit. For example, a pod P1, which has request=1 CPU core and limit=10 CPUs, is hosted on virtual machine V1. The virtual machine V1 has only 3 free CPU cores. If there is a sudden I/O surge in P1, then P1 cannot use more than 4 CPU cores (1 core allocated to P1+3 of the free cores of the virtual machine). The virtual pod autoscaler will only recommend (1.15*4)=4.6 cores as the target cores for P1. This should evict P1 and reschedule P1 in another virtual machine, such as virtual machine V2. Assume that V2 has enough free cores left (e.g., the case where V2 is a newly spun off virtual machine). Once P1 (request=4.6, limit=10) gets scheduled on V2, then P1 starts consuming 8 cores. This will require another eviction to upscale P1. Had there been enough free cores available on V1, then P1 could have been upscaled to its required amount of resources in just a single eviction compared to the two evictions here. In fact, even more evictions might have been required had there not been enough CPU cores available in the virtual machine V2 after P1 was re-scheduled to V2.

Thus, the scheduling scheme needs to ensure that enough headroom of free resources is left on a virtual machine while packing pods on the virtual machine. In this way, the cost vs upscaling-response-time optimization problem stated above effectively becomes the problem of finding an optimal amount of spare resources on a virtual machine. From the statistical data available from on-field deployments, it is observed that around 30% of the pods are active at any point of time. This information may be leveraged for implementing the best-fit bin packing scheme.

The default Kubernetes scheduler uses the "request" amount of a pod's resource and finds a "best-fit" virtual machine for the pod. The default Kubernetes scheduler does not take the resource "limit" into account while scheduling and just leaves it to the container runtime environment to enforce the resource "limit", if at all. There is a problem with leaving out the resource "limit" from scheduling calculations. Consider, for example, where there is a couple of types of pods P10 and P4 with limits of 10 CPU cores and 4 CPU cores. Due to a period of idleness (e.g., a shutdown or a holiday season), the resource "request" of P10 and P4 pods has reduced down to 1 CPU. There may be a couple of virtual machines V1 and V2 with 64 CPUs to pack. 60 P10 type pods may be packed into V1 and 60 P4 type pods may be packed into V2 considering that a current resource request is 1 CPU core for each pod. After the idle period is over, the pods are expected to go back to their regular states (30% of pods active). The approximate number of CPU cores required after upscaling the pods in V1 can be calculated as (30%*(60*limit(P_10)))=180. The same for the pods in V2 is (30% (60*limit(P_4)))=72. It is obvious that scaling the P10 pods in V1 will take longer and with more evictions than scaling the pods in V2. This is because, while packing the pods, the default Kubernetes scheduler has ignored the resource limits of the pods.

To avoid the disproportional packing of pods as stated in the above example, the resource "limit" of the pods is additionally considered by the best-fit bin packing scheme. As the on-field statistics suggest that around 30% of pods are active at a time, 30% of the resource limit should serve as a safety net to prevent pod packing from being too aggressive. While scheduling a pod, the best-fit bin packing scheme considers max(request, 30%*limit) as the resource amount to find a best fit. This best-fit bin packing scheme, when applied to the example above, will prevent more than 21 P10 type pods to be packed to V1 even if the resource request is of 1 CPU core. This is because the best-fit bin packing scheme considers max(1, 30%*10)=3 during packing and the maximum P10 pod types that can be packed inside a virtual machine with 64 cores in floor(64/3)=21. This leaves the virtual machine with an extra (64−21*1)=43 cores worth headroom. When these 21 pods try to go back to their regular usage (30% pods active at a time), the amount of extra cores required is 42 (regular_usage−current_request=21*10*30%−21*1=42). The virtual machine has enough headroom (43 cores) to allow the pods to be upscaled to their requirements with single evictions.

FIG. 4C illustrates an embodiment of a pod placement strategy 470 that may be executed to determine which node is to host a pod. The pod placement strategy 470 includes a determination 471 of cumulative IOPS and cumulative throughput for the node. A determination 472 is executed to determine available IOPS as a difference between an IOPS limit of a virtual machine and the cumulative IOPS. A determination 473 is executed to determine available throughput as a difference between a throughput limit of the virtual machine and the cumulative throughput. A determination 474 is executed to determine an IOPS difference as a difference between IOPS of the pod to be scheduled and the available IOPS. A determination 475 is executed to determine a throughput differences as a difference between throughput of the pod to be scheduled and the available throughput. A determine 476 is executed to identify a node with minimum throughput difference and IOPS difference, which may also take into account headroom (e.g., additional padding of resources). In this way, the node may be identified for deploying the pod on the node.

Figure 5:
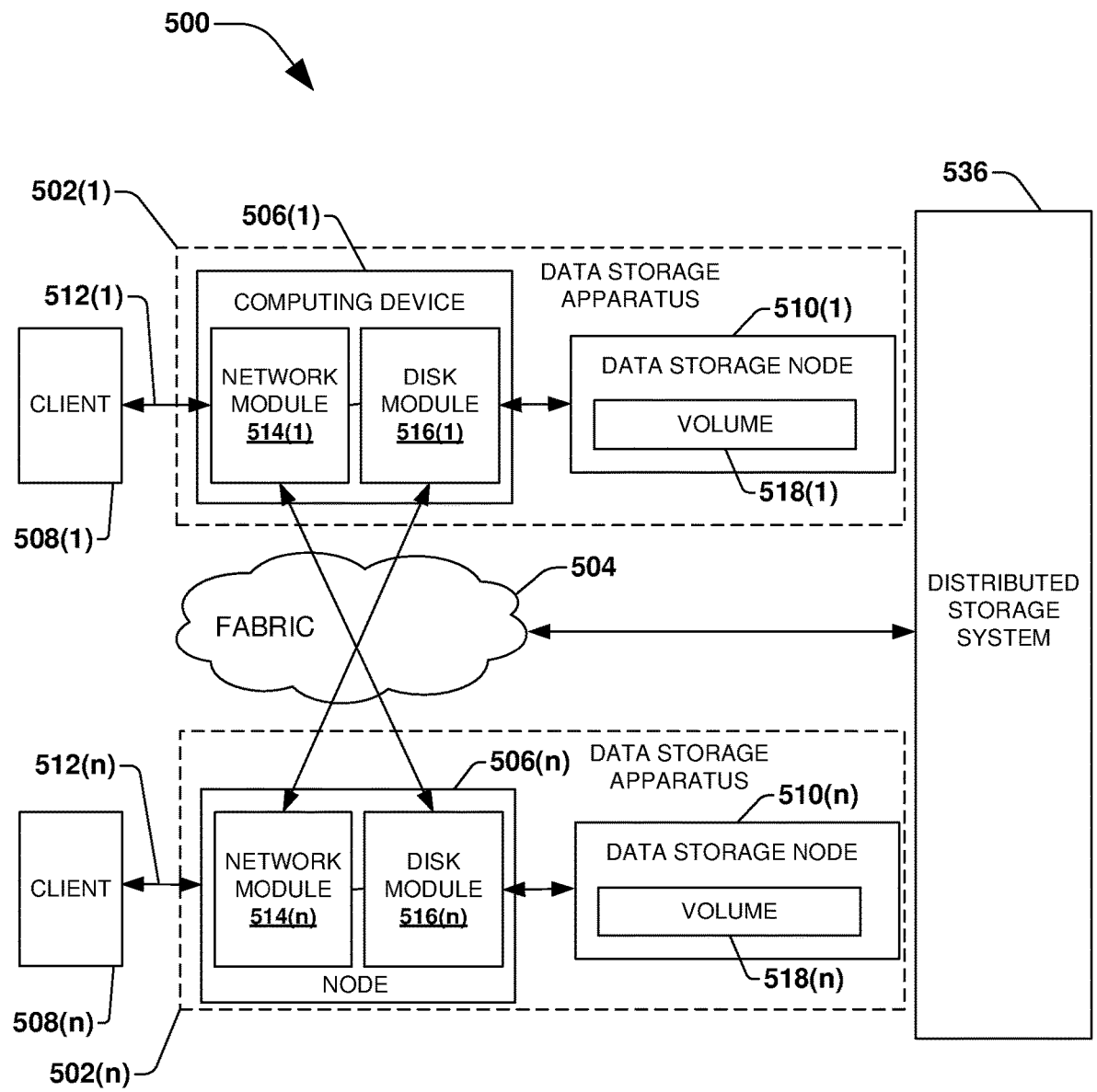
FIG. 5 is a block diagram illustrating an embodiment of a network environment with exemplary nodes in accordance with various embodiments of the present technology.

A clustered network environment 500 that may implement one or more aspects of the techniques described and illustrated herein is shown in FIG. 5. The clustered network environment 500 includes data storage apparatuses 502(1)-502(n) that are coupled over a cluster or cluster fabric 504 that includes one or more communication network(s) and facilitates communication between the data storage apparatuses 502(1)-502(n) (and one or more modules, components, etc. therein, such as, computing devices 506(1)-506(n), for example), although any number of other elements or components can also be included in the clustered network environment 500 in other examples.

In accordance with one embodiment of the disclosed techniques presented herein, computing devices 506(1)-506(n) may also include a module configured to implement the techniques described herein, as previously discussed. In accordance with one embodiment of the techniques described herein, input/output operations per second (IOPS) and throughput monitoring for dynamic resource allocation may be implemented by the module for containers hosted by the computing devices 506(1)-506(n).

In this example, computing devices 506(1)-506(n) can be primary or local storage controllers or secondary or remote storage controllers that provide client devices 508(1)-508(n) with access to data stored within data storage devices 510(1)-510(n) and storage devices of a distributed storage system 536. The computing devices 506(1)-506(n) may be implemented as hardware, software (e.g., a storage virtual machine), or combination thereof. The computing devices 506(1)-506(n) may be used to host containers of a container orchestration platform.

The data storage apparatuses 502(1)-502(n) and/or computing devices 506(1)-506(n) of the examples described and illustrated herein are not limited to any particular geographic areas and can be clustered locally and/or remotely via a cloud network, or not clustered in other examples. Thus, in one example the data storage apparatuses 502(1)-502(n) and/or computing device computing device 506(1)-506(n) can be distributed over a plurality of storage systems located in a plurality of geographic locations (e.g., located on-premise, located within a cloud computing environment, etc.); while in another example a clustered network can include data storage apparatuses 502(1)-502(n) and/or computing device computing device 506(1)-506(n) residing in a same geographic location (e.g., in a single on-site rack).

In the illustrated example, one or more of the client devices 508(1)-508(n), which may be, for example, personal computers (PCs), computing devices used for storage (e.g., storage servers), or other computers or peripheral devices, are coupled to the respective data storage apparatuses 502 (1)-502(n) by network connections 512(1)-512(n). Network connections 512(1)-512(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 508(1)-508(n) may be general-purpose computers running applications and may interact with the data storage apparatuses 502(1)-502(n) using a client/server model for exchange of information. That is, the client devices 508(1)-508(n) may request data from the data storage apparatuses 502(1)-502(n) (e.g., data on one of the data storage devices 510(1)-510(n) managed by a network storage controller configured to process I/O commands issued by the client devices 508(1)-508(n)), and the data storage apparatuses 502(1)-502(n) may return results of the request to the client devices 508(1)-508(n) via the network connections 512(1)-512(n).

The computing devices 506(1)-506(n) of the data storage apparatuses 502(1)-502(n) can include network or host computing devices that are interconnected as a cluster to provide data storage and management services, such as to an enterprise having remote locations, cloud storage (e.g., a storage endpoint may be stored within storage devices of the distributed storage system 536), etc., for example. Such computing devices 506(1)-506(n) can be attached to the cluster fabric 504 at a connection point, redistribution point, or communication endpoint, for example. One or more of the computing devices 506(1)-506(n) may be capable of sending, receiving, and/or forwarding information over a network communications channel, and could comprise any type of device that meets any or all of these criteria.

In an embodiment, the computing devices 506(1) and 506(n) may be configured according to a disaster recovery configuration whereby a surviving computing device provides switchover access to the data storage devices 510(1)-510(n) in the event a disaster occurs at a disaster storage site (e.g., the computing device computing device 506(1) provides client device 512(n) with switchover data access to data storage devices 510(n) in the event a disaster occurs at the second storage site). In other examples, the computing device computing device 506(n) can be configured according to an archival configuration and/or the computing devices 506(1)-506(n) can be configured based on another type of replication arrangement (e.g., to facilitate load sharing). Additionally, while two computing devices are illustrated in FIG. 5, any number of computing devices or data storage apparatuses can be included in other examples in other types of configurations or arrangements.

As illustrated in the clustered network environment 500, computing devices 506(1)-506(n) can include various functional components that coordinate to provide a distributed storage architecture. For example, the computing devices 506(1)-506(n) can include network modules 514(1)-514(n) and disk modules 516(1)-516(n). Network modules 514(1)-514(n) can be configured to allow the computing devices 506(1)-506(n) (e.g., network storage controllers) to connect with client devices 508(1)-508(n) over the storage network connections 512(1)-512(n), for example, allowing the client devices 508(1)-508(n) to access data stored in the clustered network environment 500.

Further, the network modules 514(1)-514(n) can provide connections with one or more other components through the cluster fabric 504. For example, the network module 514(1) of computing device 506(1) can access the data storage device 510(n) by sending a request via the cluster fabric 504 through the disk module 516(n) of computing device 506(n) when the computing device computing device 506(n) is available. Alternatively, when the computing device computing device 506(n) fails, the network module 514(1) of computing device 506(1) can access the data storage device 510(n) directly via the cluster fabric 504. The cluster fabric 504 can include one or more local and/or wide area computing networks (i.e., cloud networks) embodied as Infiniband, Fibre Channel (FC), or Ethernet networks, for example, although other types of networks supporting other protocols can also be used.

Disk modules 516(1)-516(n) can be configured to connect data storage devices 510(1)-510(n), such as disks or arrays of disks, SSDs, flash memory, or some other form of data storage, to the computing devices 506(1)-506(n). Often, disk modules 516(1)-516(n) communicate with the data storage devices 510(1)-510(n) according to the SAN protocol, such as SCSI or FCP, for example, although other protocols can also be used. Thus, as seen from an operating system on computing devices 506(1)-506(n), the data storage devices 510(1)-510(n) can appear as locally attached. In this manner, different computing devices 506(1)-506(n), etc. may access data blocks, files, or objects through the operating system, rather than expressly requesting abstract files.

While the clustered network environment 500 illustrates an equal number of network modules 514(1)-514(n) and disk modules 516(1)-516(n), other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 508(1)-508(n) can be networked with the computing devices 506(1)-506(n) in the cluster, over the storage connections 512(1)-512(n). As an example, respective client devices 508(1)-508(n) that are networked to a cluster may request services (e.g., exchanging of information in the form of data packets) of computing devices 506(1)-506(n) in the cluster, and the computing devices 506(1)-506(n) can return results of the requested services to the client devices 508(1)-508(n). In one example, the client devices 508(1)-508(n) can exchange information with the network modules 514(1)-514(n) residing in the computing devices 506(1)-506(n) (e.g., network hosts) in the data storage apparatuses 502(1)-502(n).

In one example, the storage apparatuses 502(1)-502(n) host aggregates corresponding to physical local and remote data storage devices, such as local flash or disk storage in the data storage devices 510(1)-510(n), for example. One or more of the data storage devices 510(1)-510(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 518(1)-518(n) in this example, although any number of volumes can be included in the aggregates. The volumes 518(1)-518(n) are virtual data stores or storage objects that define an arrangement of storage and one or more file systems within the clustered network environment 500. Volumes 518(1)-518(n) can span a portion of a disk or other storage device, a collection of disks, or portions of disks, for example, and typically define an overall logical arrangement of data storage. In one example, volumes 518(1)-518(n) can include stored user data as one or more files, blocks, or objects that may reside in a hierarchical directory structure within the volumes 518(1)-518(n).

Volumes 518(1)-518(n) are typically configured in formats that may be associated with particular storage systems, and respective volume formats typically comprise features that provide functionality to the volumes 518(1)-518(n), such as providing the ability for volumes 518(1)-518(n) to form clusters, among other functionality. Optionally, one or more of the volumes 518(1)-518(n) can be in composite aggregates and can extend between one or more of the data storage devices 510(1)-510(n) and one or more of the storage devices of the distributed storage system 536 to provide tiered storage, for example, and other arrangements can also be used in other examples.

In one example, to facilitate access to data stored on the disks or other structures of the data storage devices 510(1)-510(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 510(1)-510(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 510(1)-510(n) can have one or more physical ports, wherein each physical port can be assigned a target address (e.g., SCSI target address). To represent respective volumes, a target address on the data storage devices 510(1)-510(n) can be used to identify one or more of the LUNs. Thus, for example, when one of the computing devices 506(1)-506(n) connects to a volume, a connection between the one of the computing devices 506(1)-506(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 6:
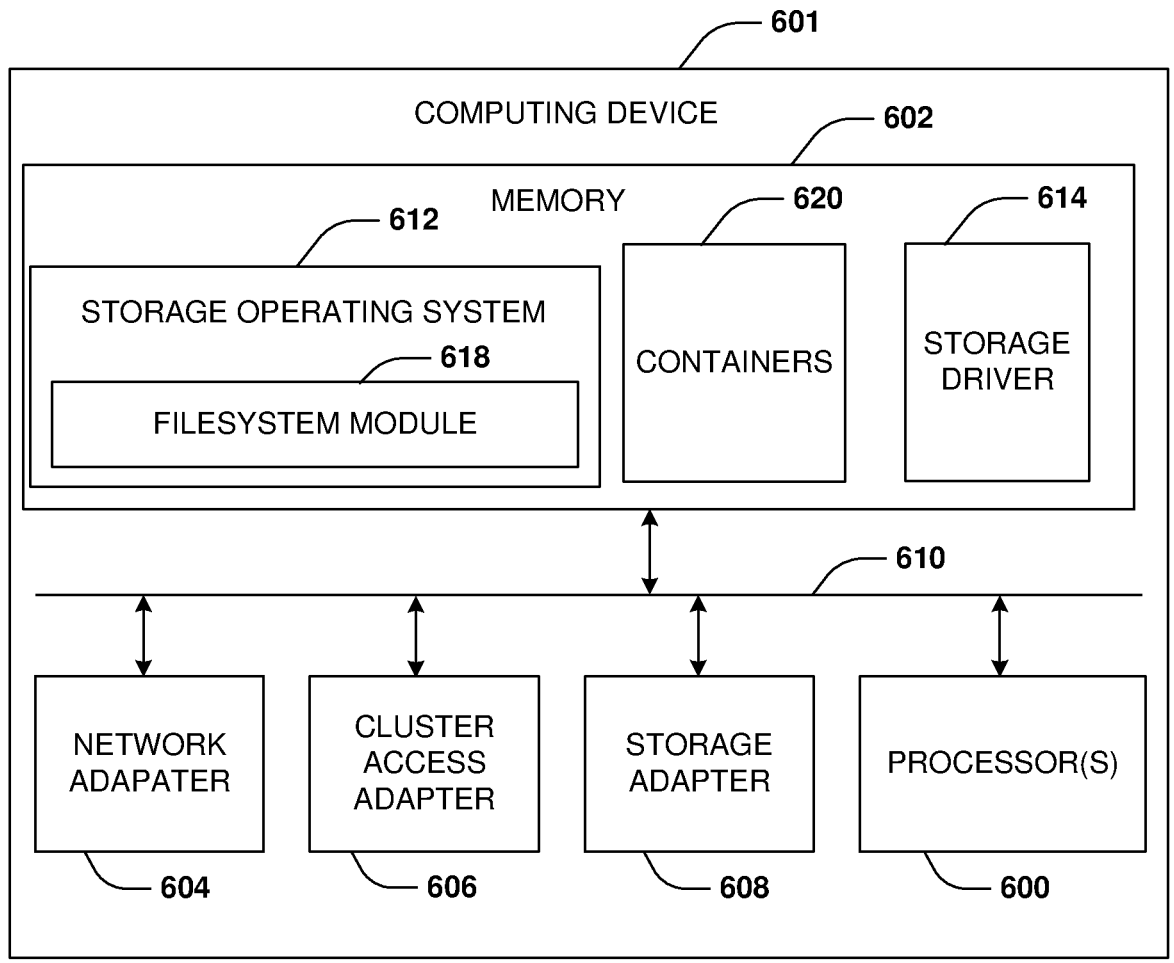
FIG. 6 is a block diagram illustrating an embodiment of various components that may be present within a node that may be used in accordance with various embodiments of the present technology.

Referring to FIG. 6, a node 601 in this particular example includes processor(s) 600, a memory 602, a network adapter 604, a cluster access adapter 606, and a storage adapter 608 interconnected by a system bus 610. In other examples, the node 601 comprises a virtual machine, such as a virtual storage machine.

The node 601 also includes a storage operating system 612 installed in the memory 602 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 604 in this example includes the mechanical, electrical and signaling circuitry needed to connect the node 601 to one or more of the client devices over network connections, which may comprise, among other things, a point-to-point connection or a shared medium, such as a local area network. In some examples, the network adapter 604 further communicates (e.g., using TCP/IP) via a cluster fabric and/or another network (e.g., a WAN) (not shown) with storage devices of a distributed storage system to process storage operations associated with data stored thereon.

The storage adapter 608 cooperates with the storage operating system 612 executing on the node 601 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 608 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 608 and, if necessary, processed by the processor(s) 600 (or the storage adapter 608 itself) prior to being forwarded over the system bus 610 to the network adapter 604 (and/or the cluster access adapter 606 if sending to another node computing device in the cluster) where the information is formatted into a data packet and returned to a requesting one of the client devices and/or sent to another node computing device attached via the cluster fabric. In some examples, a storage driver 614 in the memory 602 interfaces with the storage adapter to facilitate interactions with the data storage devices.

The storage operating system 612 can also manage communications for the node 601 among other devices that may be in a clustered network, such as attached to a cluster fabric. Thus, the node 601 can respond to client device requests to manage data on one of the data storage devices or storage devices of the distributed storage system in accordance with the client device requests.

The file system module 618 of the storage operating system 612 can establish and manage one or more file systems including software code and data structures that implement a persistent hierarchical namespace of files and directories, for example. As an example, when a new data storage device (not shown) is added to a clustered network system, the file system module 618 is informed where, in an existing directory tree, new files associated with the new data storage device are to be stored. This is often referred to as "mounting" a file system.

In the example node 601, memory 602 can include storage locations that are addressable by the processor(s) 600 and adapters 604, 606, and 608 for storing related software application code and data structures. The processor(s) 600 and adapters 604, 606, and 608 may, for example, include processing elements and/or logic circuitry configured to execute the software code and manipulate the data structures.

The storage operating system 612, portions of which are typically resident in the memory 602 and executed by the processor(s) 600, invokes storage operations in support of a file service implemented by the node 601. Other processing and memory mechanisms, including various computer readable media, may be used for storing and/or executing application instructions pertaining to the techniques described and illustrated herein. For example, the storage operating system 612 can also utilize one or more control files (not shown) to aid in the provisioning of virtual machines.

In this particular example, the node 601 also includes a module configured to implement the techniques described herein, as discussed above. In accordance with one embodiment of the techniques described herein, input/output operations per second (IOPS) and throughput monitoring for dynamic resource allocation may be implemented by the module of the node 601 for containers 620 hosted by the node 601.

The examples of the technology described and illustrated herein may be embodied as one or more non-transitory computer or machine readable media, such as the memory 602, having machine or processor-executable instructions stored thereon for one or more aspects of the present technology, which when executed by processor(s), such as processor(s) 600, cause the processor(s) to carry out the steps necessary to implement the methods of this technology, as described and illustrated with the examples herein. In some examples, the executable instructions are configured to perform one or more steps of a method described and illustrated later.

Figure 7:
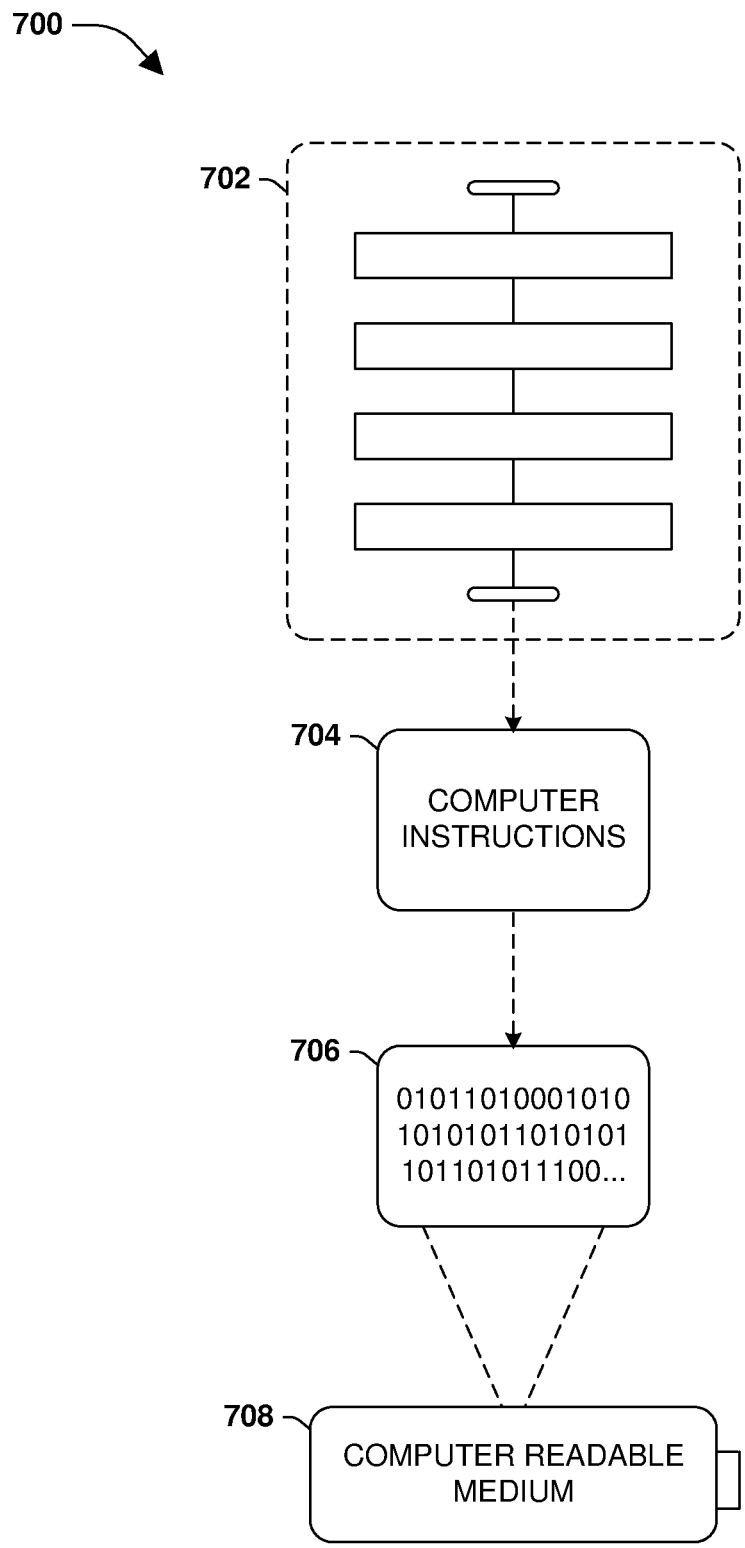
FIG. 7 is an embodiment of a computer readable medium in which various embodiments of the present technology may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 200 of FIG. 2 and/or at least some of the exemplary method 300 of FIG. 3, for example. In some embodiments, the processor-executable computer instructions 704 are configured to implement a system, such as at least some of the exemplary system 100 of FIG. 1 and/or at least some of the exemplary system 400 of FIGS. 4A and 4B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
 storing a volume within a storage resource, wherein a container orchestrated platform hosts the volume as a custom object according to a custom resource definition not natively supported by the container orchestrated platform; and
 interpreting, by a vertical pod autoscaler modified to interpret the custom resource definition of the custom object, resource utilization information of the volume by the vertical pod autoscaler:
  storing, within a database, memory and processor utilization information associated with a container running in a pod and provided with access to the volume;
  querying the database to identify historic memory and processor utilization information associated with the container;
  generating a recommendation of memory and processor allocations for the container based upon the historic memory and processor utilization information;
  in response to determining that a current memory and processor allocation for the container does not satisfy the recommendation, evicting the container by stopping the container orchestrated platform from executing the pod and removing the container from memory;
  rewriting a specification for the container with requests and limit values derived from the recommendation to create a rewritten specification comprising instructions for how to re-host and run the container; and
  re-hosting the container using resources that satisfy the rewritten specification.

2. The method of claim 1, wherein the vertical pod autoscaler is configured to:
 specify a request within the specification to bind a scheduler of the container orchestrated platform to reserve a set amount of resources for running the container, wherein the container is allowed to utilize more resources than the set amount of resources reserved by the scheduler.

3. The method of claim 1, wherein the vertical pod autoscaler is configured to:
 specify a limit value within the specification as a resource usage limit that cannot be surpassed by the container, wherein the container is evicted based upon the container attempting to access resources beyond the resource usage limit.

4. The method of claim 1, wherein the vertical pod autoscaler is configured to:
 calculate a lower bound limit for inclusion within the recommendation based upon a lower bound percentile amount applied to the historic memory and processor utilization, a lower bound safety margin, and a confidence factor, wherein the container is evicted based upon the container requesting resources that violate the lower bound limit.

5. The method of claim 4, wherein the vertical pod autoscaler is configured to:
 apply a minimum allowed cap to the lower bound limit based upon a container policy.

6. The method of claim 1, wherein the vertical pod autoscaler is configured to:
 calculate an upper bound limit for inclusion within the recommendation based upon an upper bound percentile amount applied to the historic memory and processor utilization, an upper bound safety margin, and a confidence factor, wherein the container is evicted based upon the container requesting resources that violate the upper bound limit.

7. The method of claim 6, wherein the vertical pod autoscaler is configured to:
 apply a maximum allowed cap to the upper bound limit based upon a container policy.

8. The method of claim 1, wherein the vertical pod autoscaler is configured to:
 calculate a target estimation for inclusion within the recommendation based upon a target percentile amount applied to the historic memory and processor utilization and a target safety margin; and
 rewrite the specification with the target estimation to create the rewritten specification used to re-host the container.

9. The method of claim 1, wherein the vertical pod autoscaler is configured to:
 determine that the recommendation specifies a resource amount greater than a resource allocation of a node hosting the pod that runs the container;
 create a new node with a new resource allocation derived from the recommendation; and
 migrate the pod to the new node.

10. The method of claim 8, wherein the container is evicted based upon the target estimation being a threshold percentage greater than a resource request by the container and based upon the target estimation being generated at least a threshold time since a last target estimation.

11. A method comprising:
 storing a volume within a storage resource, wherein a container orchestrated platform hosts the volume as a custom object according to a custom resource definition not natively supported by the container orchestrated platform; and
 interpreting resource utilization information of the volume by:
  storing, within a database, memory and processor utilization information associated with a container running in a pod and provided with access to the volume;
  querying the database to identify historic memory and processor utilization information associated with the container;
  generating a recommendation of memory and processor allocations for the container based upon the historic memory and processor utilization information;
  in response to determining that a current memory and processor allocation for the container does not satisfy the recommendation, evicting the container by stopping the container orchestrated platform from executing the pod and removing the container from memory;
  rewriting a specification for the container with requests and limit values derived from the recommendation to create a rewritten specification comprising instructions for how to re-host and run the container; and
  re-hosting the container using resources that satisfy the rewritten specification.

12. The method of claim 11, comprising:
specifying a request within the specification to bind a scheduler of the container orchestrated platform to reserve a set amount of resources for running the container.

13. The method of claim 11, comprising:
calculating a target estimation for inclusion within the recommendation based upon a target percentile amount applied to the memory and processor utilization and a target safety margin.

14. The method of claim 13, comprising:
removing the container from memory based upon the target estimation being a threshold percentage greater than a resource request by the container and based upon the target estimation being generated at least a threshold time since a last target estimation.

15. The method of claim 11, wherein the memory and processor utilization information comprises input/output operations per second (IOPS), and wherein the method comprises:
normalizing the IOPS as a histogram based upon a block size used to store and retrieve blocks of data.

16. A non-transitory machine readable medium comprising instructions, which when executed by a computing device, causes the computing device to:
store a volume within a storage resource, wherein a container orchestrated platform hosts the volume as a custom object according to a custom resource definition not natively supported by the container orchestrated platform; and
interpret, by a vertical pod autoscaler modified to interpret the custom resource definition of the custom object, resource utilization information of the volume by the vertical pod autoscaler:
storing, within a database, memory and processor utilization information associated with a container running in a pod and provided with access to the volume;
querying the database to identify historic memory and processor utilization information associated with the container;
generating a recommendation of memory and processor allocations for the container based upon the historic memory and processor utilization information;
in response to determining that a current memory and processor allocation for the container does not satisfy the recommendation, evicting the container by stopping the container orchestrated platform from executing the pod and removing the container from memory;
rewriting a specification for the container with requests and limit values derived from the recommendation to create a rewritten specification comprising instructions for how to re-host and run the container; and
re-hosting the container using resources that satisfy the rewritten specification.

17. The non-transitory machine readable medium of claim 16, wherein the instructions cause the computing device to:
calculate a lower bound limit for inclusion within the recommendation based upon a lower bound percentile amount applied to the memory and processor utilization, a lower bound safety margin, and a confidence factor; and
evict the container based upon the container requesting resources that violate the lower bound limit.

18. The non-transitory machine readable medium of claim 16, wherein the instructions cause the computing device to:
calculate an upper bound limit for inclusion within the recommendation based upon an upper bound percentile amount applied to the memory and processor utilization, an upper bound safety margin, and a confidence factor; and
evict the container based upon the container requesting resources that violate the upper bound limit.

19. The non-transitory machine readable medium of claim 16, wherein the instructions cause the computing device to:
calculate a target estimation for inclusion within the recommendation based upon a target percentile amount applied to the memory and processor utilization and a target safety margin; and
rewrite the specification with a request derived from the target estimation.

* * * * *